US008061043B2

(12) United States Patent
Allen et al.

(10) Patent No.: US 8,061,043 B2
(45) Date of Patent: Nov. 22, 2011

(54) POWER TOOL

(75) Inventors: Douglas W. Allen, Pewaukee, WI (US); Scott R. Fischer, Menomonee Falls, WI (US); Peter A. Banach, Milwaukee, WI (US); Steven L. Berg, Greenfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 524 days.

(21) Appl. No.: 11/940,857

(22) Filed: Nov. 15, 2007

(65) Prior Publication Data

US 2008/0115371 A1 May 22, 2008

Related U.S. Application Data

(60) Provisional application No. 60/865,943, filed on Nov. 15, 2006.

(51) Int. Cl.
*B23D 45/16* (2006.01)

(52) U.S. Cl. .......................................... 30/391; 30/388

(58) Field of Classification Search ............ 30/388–399, 30/519

See application file for complete search history.

(56) References Cited

U.S. PATENT DOCUMENTS

| | | | |
|---|---|---|---|
| D37,730 | S | 12/1905 | Wheelock |
| 1,217,521 | A | 2/1917 | Snyder |
| 1,281,214 | A | 10/1918 | Packwood |
| 1,406,071 | A | 2/1922 | Pavelka |
| 1,793,053 | A | 2/1931 | Cahill et al. |
| 1,978,369 | A | 10/1934 | Levin |
| 2,293,859 | A | 8/1942 | Scott |
| 2,337,769 | A | 12/1943 | Redenbo |
| 2,348,266 | A | 5/1944 | Selby |
| 2,414,637 | A | 1/1947 | Crump |
| 2,430,422 | A | 11/1947 | Happe |
| 2,436,692 | A | 2/1948 | Greene |
| 2,619,132 | A | 11/1952 | Pierce |
| 2,630,148 | A | 3/1953 | Ferguson |
| 2,668,567 | A | 2/1954 | Olson |
| 2,737,985 | A | 3/1956 | Utz |

(Continued)

FOREIGN PATENT DOCUMENTS

| | | |
|---|---|---|
| DE | 412 773 | 4/1925 |

(Continued)

OTHER PUBLICATIONS

Bosch CS10 7-1/4-Inc 15 Amp Circular Saw.

(Continued)

*Primary Examiner* — Hwei C Payer

(74) *Attorney, Agent, or Firm* — Michael Best & Friedrich LLP

(57) ABSTRACT

A power tool, a saw and a circular saw. The power tool may include a handle including a support portion movably supportable on the housing portion and extending substantially about the circumference of the housing portion. The support portion may include a second end movable relative to a first end such that the support portion selectively applies a force to the housing portion. The saw may include a bevel angle detent mechanism in which one of the detent member and the recess is angularly adjustable relative to the associated one of the detent support and the recess support to adjust the predetermined bevel angle position. A bevel angle detent mechanism may include an engagement operating assembly operable between a detent engagement-enabled condition, in which the detent member is engageable in the recess, and a detent engagement-prevention condition, in which the detent member is prevented from engaging the recess. The circular saw may include a spindle lock assembly.

24 Claims, 22 Drawing Sheets

U.S. PATENT DOCUMENTS

| | | | |
|---|---|---|---|
| 2,781,800 | A | 2/1957 | Papworth |
| 2,783,790 | A | 3/1957 | Keesling |
| 2,793,661 | A | 5/1957 | Olson |
| 2,822,005 | A | 2/1958 | Lee et al. |
| 2,879,815 | A | 3/1959 | Papworth |
| 2,946,358 | A | 7/1960 | Bruck |
| 2,961,016 | A | 11/1960 | Papworth |
| 2,984,757 | A | 5/1961 | Papworth |
| 3,028,890 | A | 4/1962 | Atkinson et al. |
| 3,044,171 | A | 7/1962 | Cecere |
| 3,322,170 | A | 5/1967 | Persson |
| 3,469,313 | A | 9/1969 | Martin |
| 3,580,342 | A | 5/1971 | Matthews |
| 3,602,052 | A | 8/1971 | Frost |
| 3,768,359 | A | 10/1973 | Koefferlein |
| 3,785,053 | A | 1/1974 | Michaelson |
| 3,795,168 | A | 3/1974 | Spachner et al. |
| 3,848,647 | A | 11/1974 | Fell |
| 3,876,015 | A | 4/1975 | Kivela |
| 3,923,126 | A | 12/1975 | Bidanset |
| 3,945,120 | A | 3/1976 | Ritz |
| 4,036,089 | A | 7/1977 | Criblez |
| 4,137,632 | A | 2/1979 | Pfanzer |
| 4,238,884 | A | 12/1980 | Walton, II |
| 4,240,204 | A | 12/1980 | Walton, II et al. |
| 4,245,390 | A | 1/1981 | Bond |
| 4,255,858 | A | 3/1981 | Getts |
| 4,262,564 | A | 4/1981 | Kaltenbach |
| 4,276,675 | A | 7/1981 | Pioch |
| 4,287,800 | A | 9/1981 | Persson |
| 4,368,598 | A | 1/1983 | Kuhlmann |
| 4,462,282 | A | 7/1984 | Biek |
| 4,516,324 | A | 5/1985 | Heininger, Jr. et al. |
| 4,522,270 | A | 6/1985 | Kishi |
| 4,522,276 | A | 6/1985 | Fogg et al. |
| 4,570,500 | A | 2/1986 | Richter |
| 4,685,214 | A | 8/1987 | Shearon et al. |
| 4,693,008 | A | 9/1987 | Velie |
| 4,785,540 | A | 11/1988 | Arvidsson |
| 4,856,394 | A | 8/1989 | Clowers |
| 4,870,758 | A | 10/1989 | Fushiya |
| 4,912,348 | A | 3/1990 | Maki et al. |
| 4,912,349 | A | 3/1990 | Chang |
| 4,947,908 | A | 8/1990 | O'Banion et al. |
| 4,976,173 | A | 12/1990 | Yang |
| 4,982,501 | A | 1/1991 | Sauerwein et al. |
| 4,984,369 | A | 1/1991 | Flint et al. |
| 4,991,298 | A | 2/1991 | Matre |
| 4,998,353 | A | 3/1991 | Fukuda et al. |
| D315,854 | S | 4/1991 | Kawakami et al. |
| 5,005,295 | A | 4/1991 | Fushiya |
| 5,007,172 | A | 4/1991 | Palm |
| 5,040,444 | A | 8/1991 | Shiotani et al. |
| 5,044,568 | A | 9/1991 | Shigemizu |
| 5,058,470 | A | 10/1991 | Fröhlich |
| 5,065,476 | A | 11/1991 | Dohse et al. |
| 5,070,576 | A | 12/1991 | Banta |
| 5,075,976 | A | 12/1991 | Young |
| D323,274 | S | 1/1992 | Sasaki et al. |
| 5,079,844 | A | 1/1992 | Palm |
| 5,083,376 | A | 1/1992 | Lentino |
| 5,089,738 | A | 2/1992 | Bergqvist et al. |
| 5,129,300 | A | 7/1992 | Kawakami |
| 5,134,777 | A | 8/1992 | Meyer et al. |
| 5,170,532 | A | 12/1992 | Holmin et al. |
| 5,193,281 | A | 3/1993 | Kasten |
| 5,201,146 | A | 4/1993 | Fushiya |
| 5,205,043 | A | 4/1993 | Batt et al. |
| D335,433 | S | 5/1993 | Schultz et al. |
| 5,311,949 | A | 5/1994 | Chapin |
| 5,327,648 | A | 7/1994 | Ullmann |
| 5,339,572 | A | 8/1994 | Eicher |
| 5,347,902 | A | 9/1994 | Brickner et al. |
| 5,374,809 | A | 12/1994 | Fox et al. |
| 5,375,666 | A | 12/1994 | Pettet et al. |
| 5,394,592 | A | 3/1995 | Quick |
| 5,407,381 | A | 4/1995 | Schaefer et al. |
| 5,463,918 | A | 11/1995 | Lemieux et al. |
| 5,466,183 | A | 11/1995 | Kirn et al. |
| 5,475,927 | A | 12/1995 | Dorma |
| 5,479,840 | A | 1/1996 | Hilliard et al. |
| 5,533,581 | A | 7/1996 | Barth et al. |
| 5,561,907 | A | 10/1996 | Campbell et al. |
| D376,083 | S | 12/1996 | Verdura et al. |
| D377,303 | S | 1/1997 | Nagel |
| 5,595,250 | A | 1/1997 | Bourke |
| 5,598,636 | A | 2/1997 | Stolzer |
| 5,640,741 | A | 6/1997 | Yano |
| D380,658 | S | 7/1997 | Bruno et al. |
| D382,458 | S | 8/1997 | Hogue et al. |
| 5,681,214 | A | 10/1997 | Kleider et al. |
| D386,658 | S | 11/1997 | Jansson et al. |
| 5,687,483 | A | 11/1997 | Neubert et al. |
| 5,687,802 | A | 11/1997 | Spooner et al. |
| 5,697,158 | A | 12/1997 | Klinzing et al. |
| D393,194 | S | 4/1998 | Hogue et al. |
| 5,755,293 | A | 5/1998 | Bourke |
| D396,175 | S | 7/1998 | Chung |
| 5,778,649 | A | 7/1998 | Losdahl et al. |
| 5,782,000 | A | 7/1998 | Bednar |
| D401,128 | S | 11/1998 | Zurwelle |
| 5,832,611 | A | 11/1998 | Schmitz |
| 5,855,070 | A | 1/1999 | Grabowski |
| 5,856,715 | A | 1/1999 | Peot et al. |
| D408,699 | S | 4/1999 | Zurwelle |
| 5,924,497 | A | 7/1999 | Spooner et al. |
| 5,940,977 | A | 8/1999 | Moores, Jr. |
| 5,942,975 | A | 8/1999 | Sorensen |
| 5,967,013 | A | 10/1999 | McKenzie et al. |
| 5,984,020 | A | 11/1999 | Meyer et al. |
| 6,044,559 | A | 4/2000 | Holst |
| D424,902 | S | 5/2000 | Gildersleeve et al. |
| D428,787 | S | 8/2000 | Smolinski et al. |
| 6,108,867 | A | 8/2000 | Nagashima |
| 6,108,916 | A | 8/2000 | Zeiler et al. |
| 6,138,364 | A | 10/2000 | Schmitz |
| D433,907 | S | 11/2000 | Fuchs et al. |
| D436,011 | S | 1/2001 | Fuchs et al. |
| 6,173,631 | B1 | 1/2001 | Schock |
| D447,924 | S | 9/2001 | Neitzell et al. |
| 6,301,790 | B1 | 10/2001 | Zeiler et al. |
| 6,588,112 | B2 | 7/2003 | Zeiler et al. |
| 7,096,588 | B2 * | 8/2006 | Zeiler et al. ..................... 30/391 |
| 7,191,526 | B2 * | 3/2007 | Zeiler et al. ..................... 30/391 |
| 7,308,764 | B2 * | 12/2007 | Zeiler et al. ..................... 30/391 |
| 7,497,152 | B2 * | 3/2009 | Zeiler et al. ........................ 83/13 |
| 2004/0003698 | A1 | 1/2004 | Zeiler et al. |

FOREIGN PATENT DOCUMENTS

| | | |
|---|---|---|
| DE | 803 013 | 2/1951 |
| DE | 74 42 904 | 9/1975 |
| DE | 79 04 242 | 7/1980 |
| DE | 31 14906 | 10/1982 |
| DE | 38 28 785 | 4/1989 |
| DE | 38 25 477 | 2/1990 |
| DE | 40 21 277 | 3/1991 |
| DE | 41 03 809 | 8/1991 |
| DE | 41 02 421 | 7/1992 |
| DE | 41 02 838 | 8/1992 |
| DE | 41 16 343 | 11/1992 |
| DE | 93 19 263 | 3/1994 |
| DE | 44 06 718 | 8/1995 |
| EP | 0 072 282 | 2/1983 |
| EP | 0 125 101 | 11/1984 |
| EP | 0 267 472 | 5/1988 |
| EP | 0 422 773 | 4/1991 |
| EP | 0 493 033 | 7/1992 |
| EP | 0 561 473 | 9/1993 |
| EP | 0 768 138 | 4/1997 |
| EP | 0 936 032 | 8/1999 |
| EP | 1 313 180 | 5/2003 |
| GB | 2 026 928 | 2/1980 |
| GB | 2 238 980 | 6/1991 |
| GB | 2 340 443 | 2/2000 |
| JP | 10-166283 | 6/1998 |
| WO | WO 92/05003 | 4/1992 |
| WO | WO 92/12823 | 8/1992 |
| WO | WO 92/12824 | 8/1992 |

| | | |
|---|---|---|
| WO | WO 92/12825 | 8/1992 |
| WO | WO 92/20491 | 11/1992 |
| WO | WO 94/00264 | 1/1994 |

OTHER PUBLICATIONS

DeWalt Heavy-Duty 7-¼" (184 mm) Lightweight Circular Saw Kit with High Strength Base and Electric Brake—DW369CSK.

Makita 7-¼" Circular Saw Model 5007NBK.

Makita Instruction Manual for Cordless Recipro Saw Model 4390D and Model 4390DW With Fast Charger, Feb. 19, 1991.

Ridgid 7-¼" Circular Saw R3200.

International Preliminary Report on Patentability for PCT/US2007/084850, dated May 28, 2009.

* cited by examiner

POWER TOOL

RELATED APPLICATIONS

The present application claims priority to U.S. Provisional Patent Application Ser. No. 60/865,943, filed Nov. 15, 2006, the entire contents of which is incorporated by reference.

The present application is related to U.S. patent application Ser. Nos. 11/339,450, filed Jan. 24, 2006, now U.S. Pat. No. 7,497,152; 11/338,235, filed Jan. 24, 2006, now U.S. Pat. No. 7,308,764; 11/322,459, filed Dec. 30, 2005, now abandoned; 11/322,457, filed Dec. 30, 2005, now abandoned; and 11/297,898, filed Dec. 9, 2005, now abandoned; and to U.S. Pat. Nos. 7,191,526, issued Mar. 20, 2007; 7,096,588, issued Aug. 29, 2006; 6,588,112, issued Jul. 8, 2003; 6,301,790, issued Oct. 16, 2001; and 6,108,916, issued Aug. 29, 2000, the entire contents of all of which are hereby incorporated by reference.

FIELD OF THE INVENTION

The present invention relates to power tools and, in some independent aspects, to a handle arrangement for power tools.

SUMMARY

One independent problem with a circular saw including an operator's handle that is integrally formed with the housing, is that, in some cutting operations, the operator may prefer a "push handle" to a "top handle" or vice versa. However, the operator cannot adjust the handle to the desired position relative to the housing.

Another independent problem with a circular saw with an integral handle is that, when the depth of cut of the saw blade is adjusted, the handle position and orientation also changes. The resulting handle position is often uncomfortable and is seldom the optimal position for operation of the circular saw.

For example, in a circular saw with a front pivot depth adjustment assembly, at full depth of cut, the handle is typically positioned as a "push handle". At a minimum depth of cut, the handle position is changed to a "top handle" position. In a circular saw with a rear pivot depth adjustment assembly, at full depth of cut, the handle must be oriented above a typical "push handle" position because, when the saw is adjusted to a minimum depth of cut, the handle is lowered.

One independent problem with the handle arrangement disclosed in U.S. Pat. No. 4,516,324 is that the circular saw includes two separate handles. The handle component that is not in use must be stored and may be lost or damaged.

Another independent problem with the handle arrangement disclosed in U.S. Pat. No. 4,516,324 is that the saw includes a handle that is only a "push handle" or a "top handle" and that it is not adjustable between these configurations. Additional fasteners are also required.

In some aspects, the present invention may provide a handle arrangement for a power tool that alleviates the one or more of the above-described and other independent problems with the above-described handle arrangements. In some aspects, a power tool, such as a circular saw, generally includes a handle that is movable relative to the housing. The handle may be pivotable about the axis of the saw blade relative to the housing.

Also, in some aspects, the power tool may include a locking assembly to lock the handle in a position relative to the housing. The locking assembly may provide a frictional engagement between the handle and the housing and may includes a clamping member that releasably applies a clamping force to the housing to lock the handle in a position relative to the housing. The locking assembly may also provide a positive engagement between the handle and the housing and includes inter-engaging teeth formed on both the handle and the housing.

In addition, in some aspects, the power tool may include means for connecting the switch to the motor to accommodate movement of the switch with the handle and relative to the motor. Preferably, the connecting means are provided by a wiring arrangement.

Further, in some aspects, the power tool may provide interaction between the switch and the locking assembly to prevent inadvertent operation of one when the other is operated. Specifically, the switch preferably cannot be operated when the locking assembly is unlocked, and the locking assembly cannot be unlocked when the switch is connecting the motor to the power source.

Also, in some aspects, the power tool may a handle supported for movement relative to at least a portion of the housing, the handle including a grip portion graspable by an operator to provide for movement of the tool element relative to a work piece, and a support portion movably supportable on the housing portion and extending substantially about the circumference of the housing portion.

The support portion may include a first end, a second end and an intermediate portion between the first end and the second end, the second end being movable relative to the first end such that the support portion selectively applies a force to the housing portion. The intermediate portion may be flexible to accommodate movement of the second end relative to the first end.

The power tool may include an actuating assembly operable to selectively cause the support portion to apply force to the housing portion. The actuating assembly may include an actuating member supported by the first end of the support portion, and a connecting member connected between the actuating member and the second end, movement of the actuating member causing movement of the second end relative to the first end.

In addition, a saw may include a bevel detent angle mechanism operable to adjustably position the saw blade in a bevel angle position, the mechanism including a detent member, a detent support supported by one of the housing and the shoe plate, the detent member being in an angular position relative to the detent support, structure defining a recess, and a recess support supported by the other of the housing and the shoe plate, the recess being in an angular position relative to the recess support, the detent member being engageable in the recess to position the saw blade in a predetermined bevel angle position. One of the detent member and the recess may be angularly adjustable relative to the associated one of the detent support and the recess support to adjust the predetermined bevel angle position of the saw blade when the detent member is engaged in the recess.

Further, a saw may include a bevel detent angle mechanism operable to adjustably position the saw blade in a bevel angle position, and the mechanism may include an engagement operating assembly operable between a detent engagement-enabled condition, in which the detent member is engageable in the recess in a predetermined angular position, and a detent engagement-prevention condition, in which, in the predetermined bevel angle position, the detent member is prevented from engaging the recess.

In some aspects, a circular saw generally includes a drive assembly drivable by the motor, the drive assembly including a spindle operable to support a saw blade, the spindle having an outer surface, a stop surface being defined on the outer surface, a housing assembly support the motor and the drive assembly, the housing assembly having a wall defining an opening, the housing assembly defining a linear guide proximate the opening, and a spindle lock assembly supported by the housing assembly and selectively engageable with the spindle to prevent rotation of the spindle. The spindle lock assembly may include a lock member extending through the opening and slidable in the guide, the lock member having an inner end engageable with the stop surface to prevent rotation of the spindle and an outer end, an actuator button connected to the outer end of the lock member and engageable by an operator to move the lock member toward the spindle, the button defining laterally-extending surfaces engageable with an inner surface of the wall of the housing assembly to limit outward movement of the lock member, and a spring member surrounding the lock member and positioned between the guide and the button, the spring member biasing the lock member out of engagement with the spindle.

One independent advantage of the present invention is that the handle is movable relative to the housing of the power tool to allow the operator to position the handle as desired for a given cutting operation. As a result, the operator can adjust the handle to a position that is most comfortable and allows the greatest control of the circular saw during cutting operations.

Another independent advantage of the present invention is that, when the circular saw is adjusted to change the depth of cut of the saw blade, the operator can also adjust the handle to an optimum position for the given cutting operation.

Yet another independent advantage of the present invention is that the circular saw does not include additional components that must be substituted for one another to change the configuration of the handle or additional fasteners. This reduces the chance that such an additional component is lost or damaged and also eliminates the need to store additional components.

A further independent advantage of the present invention is that the handle is adjustable to substantially any position between a first position, such as a "push handle" position, and a second position, such as a "top handle" position.

Other independent features and independent advantages of the invention will become apparent to those skilled in the art upon review of the following detailed description and drawings.

Figure 1A:
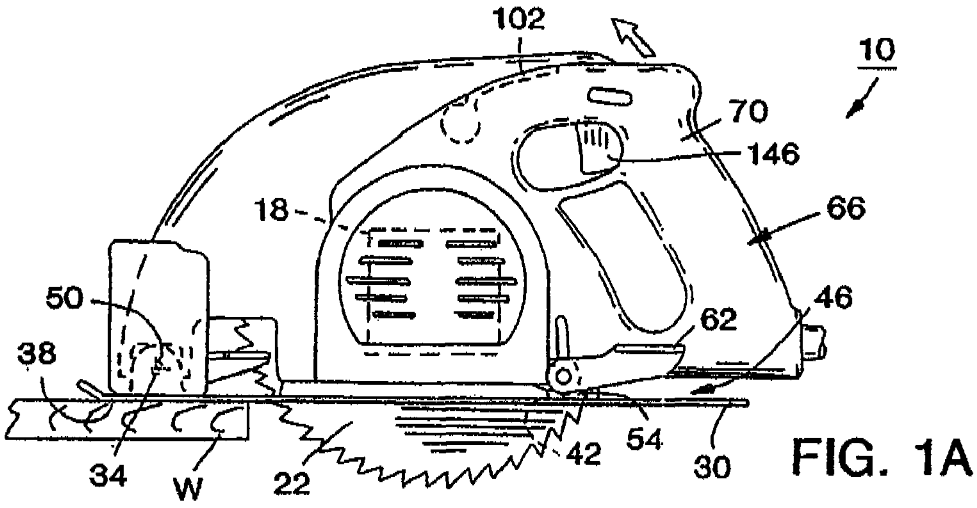
FIGS. 1A, 1B and 1C are side views of a power tool embodying the invention and illustrating the adjustment of the handle arrangement.

Before at least one independent embodiment of the invention is explained in detail, it is to be understood that the invention is not limited in its application to the details of the construction and arrangements of the components set forth in the following description or illustrated in the drawings. The invention is capable of other embodiments and of being practiced or carried out in various ways. Also, it is to be understood that the phraseology and terminology used herein is for the purpose of description and should not be regarded as limiting.

The use of "including", "having", and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order. The use of directional or positional terms (e.g., forward, rearward, front, rear, etc.) are for the purpose of description and should not be regarding as limiting.

DETAILED DESCRIPTION

A power tool embodying independent aspects of the invention is illustrated in FIG. 1A. In the illustrated construction, the power tool is a circular saw 10 and includes a motor housing 14 supporting an electric motor 18 (shown schematically in FIG. 1A). The motor 18 is connectable to a power source and is operable to rotatably drive a tool element, such as a saw blade 22, about an axis 26 to cut a workpiece W.

Figure 1B:
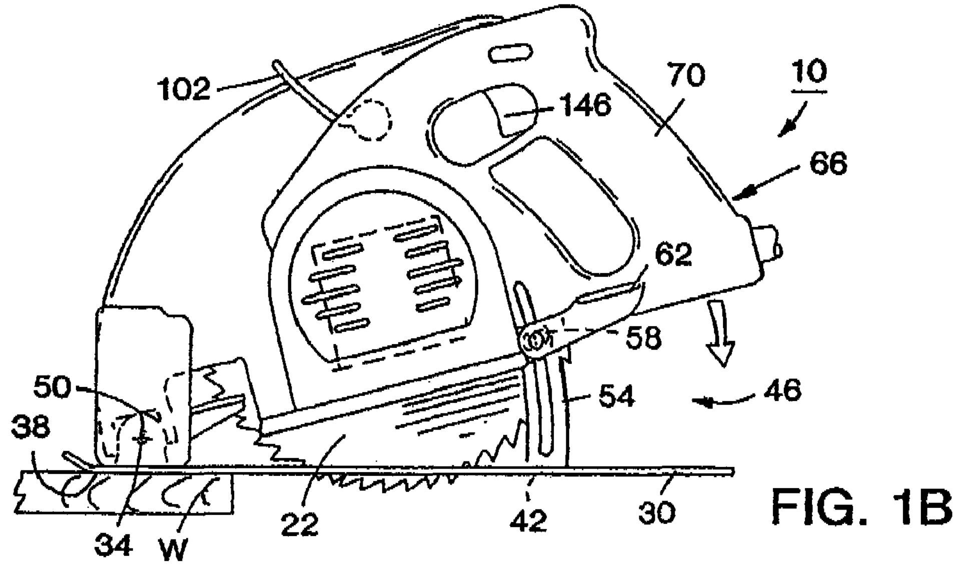
Figure 1C:
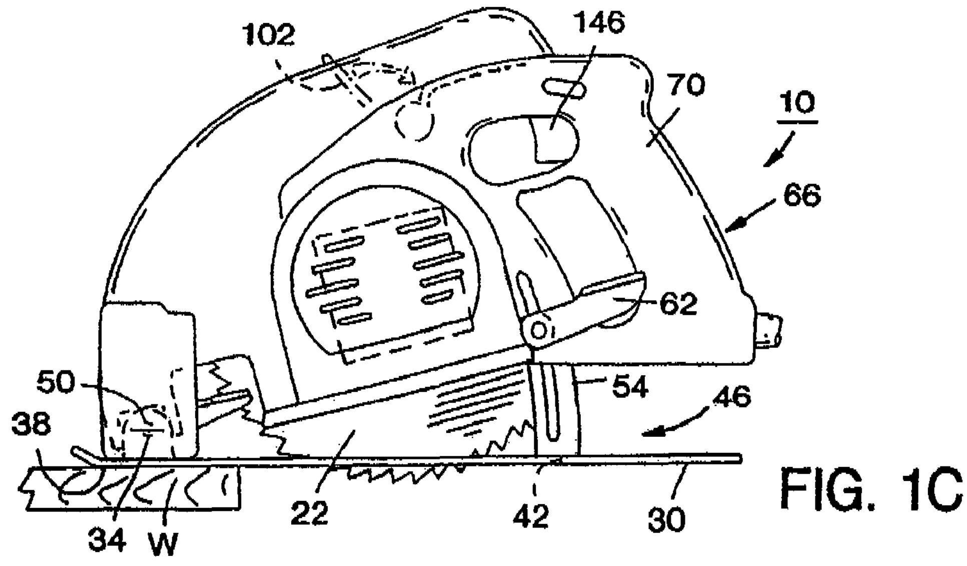

The circular saw 10 also includes (see FIGS. 1A-1C) a shoe plate 30 connected to the housing 14 for pivotal movement about a pivot axis 34. The shoe plate 30 has a support surface 38 for supporting the circular saw 10 on the surface of the workpiece W. An aperture 42 is defined by the shoe plate 30. A portion of the saw blade 22 extends through the aperture 42 to cut the workpiece W. FIG. 1A illustrates the shoe plate 30 adjusted so that the saw blade 22 is at a maximum depth of cut. FIGS. 1B and 1C illustrate the shoe plate 30 adjusted so that the saw blade 22 is at a minimum depth of cut.

In the illustrated construction, the circular saw 10 includes a front pivot depth adjustment assembly 46 to adjust the depth of cut of the saw blade 22. The depth adjustment assembly 46 includes a pivot member 50 defining the pivot axis 34 and pivotally connecting the shoe plate 30 to the housing 14. As shown in FIG. 1B, a guide member 54 cooperates with a depth adjustment locking member 58 (shown in phantom) to lock the shoe plate 30 in a pivoted position relative to the housing 14 thereby fixing the depth of cut of the saw blade 22. A depth adjustment lever 62 operates the locking member 58 between locked and unlocked positions.

In other constructions (not shown), the circular saw 10 may include, for example, a rear pivot depth adjustment assembly or a drop shoe depth adjustment assembly rather than the front pivot depth adjustment assembly 46. It should be understood that the present invention applies to a circular saw with any type of depth adjustment assembly.

The circular saw 10 also includes (see FIGS. 2-6) a movable handle arrangement 66. The movable handle arrangement 66 includes a main operator's handle member 70 movably supported on a support portion 72 of the housing 14 so that the position of the handle member 70 is adjustable relative to the housing 14. Further, with the depth adjustment assembly 46 locked and the saw blade 22 at a desired depth of cut, the handle member 70 is adjustable relative to the shoe plate 30 and relative to the surface of the workpiece W (as shown in the change of position between FIGS. 1B and 1C).

In the illustrated construction, the handle member 70 has (see FIGS. 4-6) opposite handle halves 74 and a rearward grip member 78. Further, in the illustrated construction, the handle member 70 is supported to be pivotable about the axis 26 of the saw blade 22 relative to the housing 14. However, in the other constructions (not shown), the handle member 70 may be pivotable about an axis that is generally parallel to the axis 26. Also, in yet other constructions (not shown), the handle member 70 may be slidable along an axis normal to the axis 26 relative to the housing 14.

The circular saw 10 also includes (see FIGS. 3-7) a locking assembly 82 to fix the handle member 70 on the support portion 72 of the housing 14 in a pivoted position relative to the housing 14. As explained in more detail below, the locking assembly 82 is operable between a locked condition (shown in FIGS. 4 and 6), in which the handle member 70 is fixed in a position relative to the housing 14, and an unlocked condition (shown in FIG. 5), in which the position of the handle member 70 relative to the housing 14 is adjustable.

Figure 3:
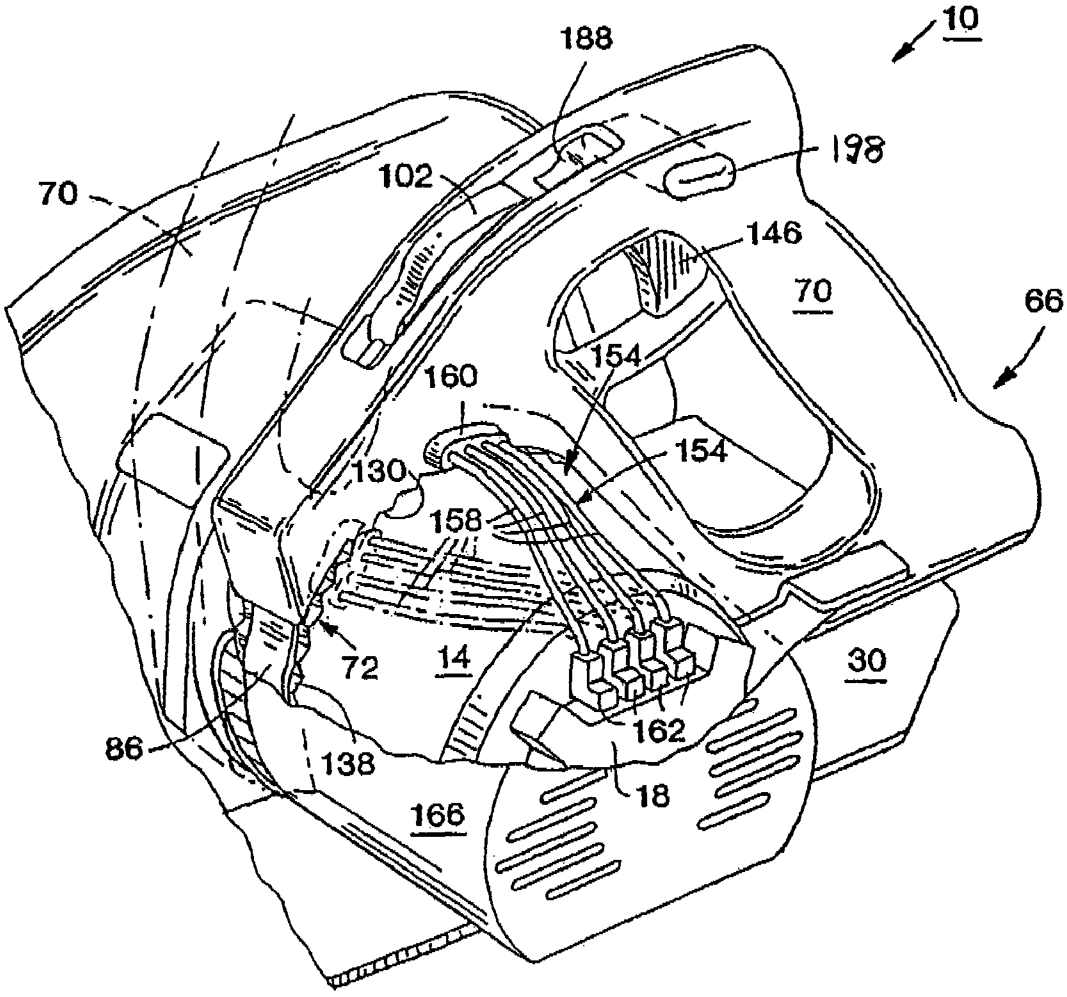
FIG. 3 is an enlarged perspective view of a portion of the power tool shown in FIG. 2 with portions cut away.
Figure 4:
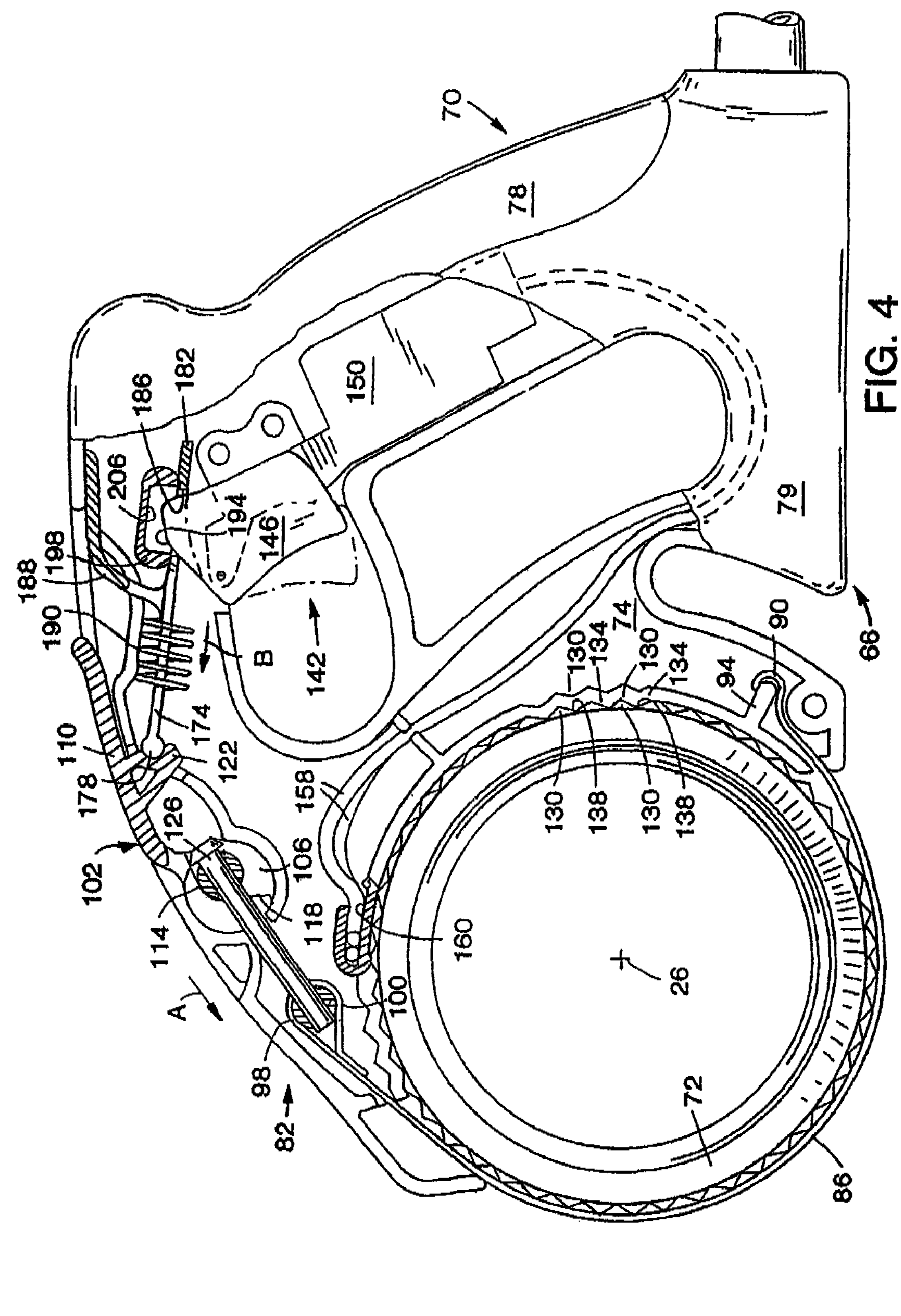
FIG. 4 is a side partial cross-sectional view of the handle arrangement shown in FIG. 3.
Figure 5:
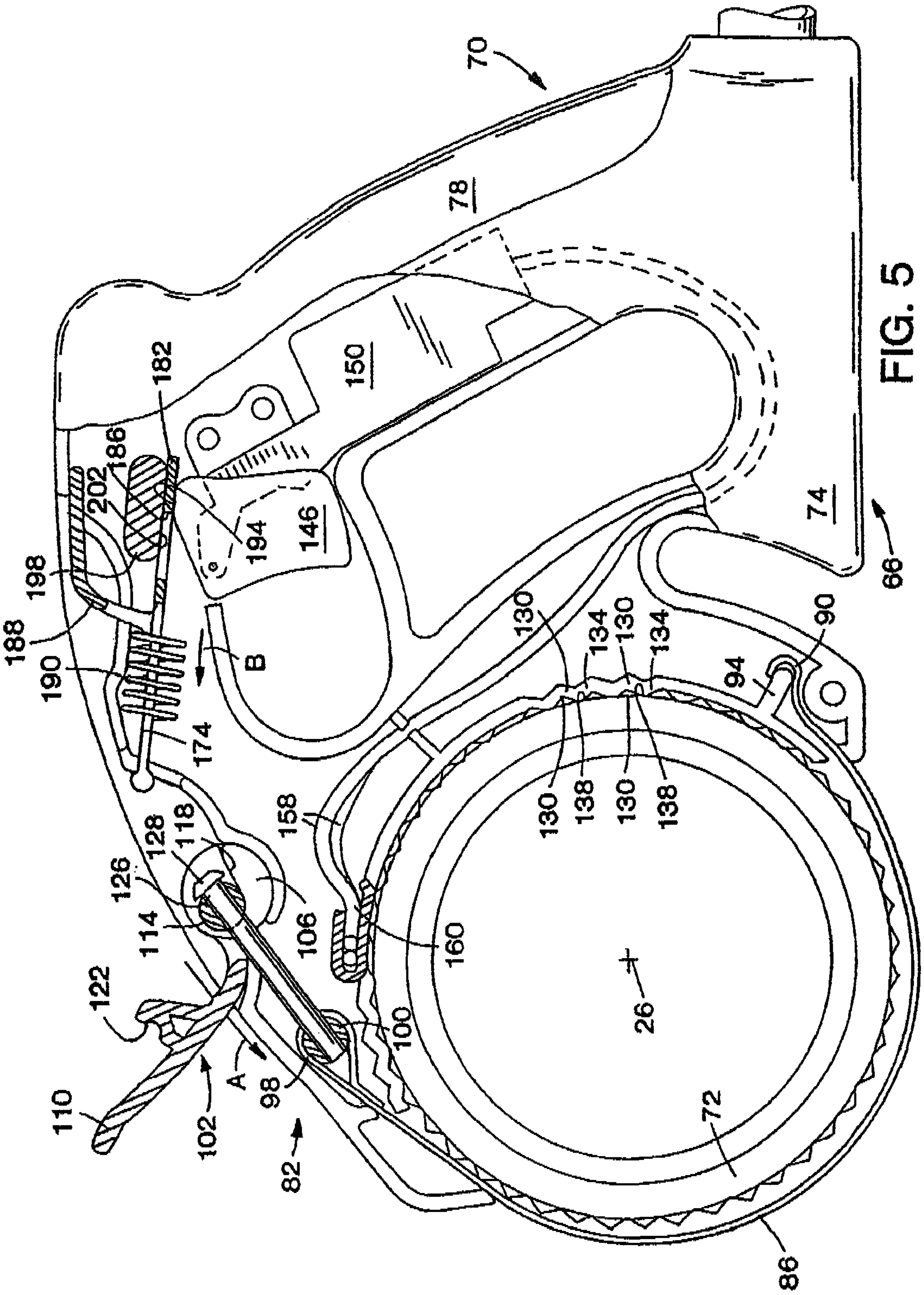
FIG. 5 is a view similar to that shown in FIG. 4 and illustrating the locking assembly in an unlocked condition.

The locking assembly 82 includes (see FIGS. 3-7) a locking member 86 which, in the illustrated construction, is a clamping band movably supported on the handle member 70 to releasably apply a clamping force to the support portion 72 of the housing 14. As shown in FIGS. 4 and 5, one end 90 of the locking member 86 is fixed to a stud 94 formed on the handle member 70. The other end 98 of the locking member 86 supports a through pin 100 and is movably connected to the handle member 70, as explained in more detail below. The handle member 70 and the locking member 86 are connected about the support portion 72 of the housing 14.

The locking assembly 82 also includes (see FIGS. 3-7) an actuating member 102 for moving the locking member 86 between a locked position and an unlocked position corresponding to the locked condition and the unlocked condition, respectively, of the locking assembly 82. The actuating member 102 is pivotably supported on the handle member 70 and includes a cam-shaped portion 106 and a lever portion 110. A tapped pin 114 is supported off-center in the cam-shaped portion 106, and an annular opening 118 is formed in the cam-shaped portion 106. A tab 122 extends from the lower surface of the lever portion 110.

To movably connect the end 98 of the locking member 86 to the handle member 70, the locking assembly 82 also includes a threaded pin 126 which engages the through pin 100 connected to the end 98 of the locking member 86. The threaded pin 126 also extends through the tapped pin 114 supported in the cam-shaped portion 106 of the actuating member 102. The annular opening 118 accommodates pivoting movement of the actuating member 102 relative to the threaded pin 126.

To move the locking member 86 between the locked and unlocked positions, the actuating member 102 is pivoted, moving the threaded pin 126 and the end 98 of the locking member 86. As the actuating member 102 is moved from the locked position (shown in FIG. 4) to the unlocked position (shown in FIG. 5), the threaded pin 126 is moved in the direction of arrow A. The locking member 86 is thus moved to the unlocked position (as shown in FIG. 5) and does not apply a clamping force to the support portion 72 to fix the handle member 70 in position relative to the housing 14.

To move the locking member 86 to the locked position, the actuating member 102 is moved from the unlocked position (shown in FIG. 5) to the locked position (shown in FIG. 4) causing the threaded pin 126 to be in direction opposite to arrow A. The locking member 86 is thus moved to the locked position (shown in FIG. 4) and applies a clamping force to the support portion 72 of the housing 14.

In the unlocked position (shown in FIG. 5), the threaded pin 126 is adjustable to change the clamping force applied by the locking member 86 when the locking member 86 is in the locked position. With the actuating member 102 in the unlocked position, the exposed end 128 of the threaded pin 126 is accessible by the operator to threadably loosen or tighten the locking member 86. This adjustment of the locking member 86 may be necessary due to manufacturing tolerances or may become necessary due to wear of the movable handle arrangement 66.

The locking assembly 82 also includes (see FIGS. 3-5) inter-engaging teeth 130 formed on the support portion 72 of the housing 14 and on the handle member 70. The inter-engaging teeth 130 provide a plurality of complementary locking projections 134 and locking recesses 138 formed on the support portion 72 of the housing 14 and on the handle member 70. As shown in FIG. 3, the clamping force applied by the locking member 86 to the housing 14 causes close engagement of the inter-engaging teeth 130. As shown in FIG. 5, release of the clamping force allows the inter-engaging teeth 130 to be disengaged and moved relative to each other.

In the preferred illustrated embodiment, the locking assembly 82 provides both a frictional engagement, through the clamping force applied by locking member 86 to the support portion 72 of the housing 14, and a positive engagement, through the inter-engaging teeth 130. In other constructions (not shown), however, the locking assembly 82 may only provide either a frictional engagement or a positive engagement.

For example, the locking assembly 82 may include only the frictional engagement provided by a locking member, similar to the locking member 86, applying a clamping force to the support portion of the housing 14. Alternatively, the locking assembly 82 may provide only the positive engagement, such as by a locking projection that is engageable with a locking recess to fix the handle member 70 in a position relative to the housing 14. Such a positive engagement could be provided by a detent assembly between the handle member 70 and the support portion 72 of the housing 14 with locking recesses corresponding to respective positions of the handle member 70 relative to the housing 14.

The circular saw 10 also includes (see FIGS. 3-7) a switch assembly 142 for selectively connecting the motor 18 to the power source to energize the motor 18. The switch assembly 142 is operable between an unoperated condition, in which the motor 18 is not connected to the power source, and an operated condition, in which the motor 18 is connected to the power source. The switch assembly 142 includes a depressable trigger 146 connected to an on/off switch 150. In the illustrated construction, the trigger 146 and the switch 150 are mounted for movement with the handle member 70 and relative to the motor 18.

The circular saw 10 also includes means for connecting the switch 150 to the motor 18. The connecting means accommodates movement of the switch 150 relative to the motor 18 so that, in any position of the handle member 70 relative to the housing 14, the switch 150 is operable to selectively connect the motor 18 to the power source.

In the illustrated construction, the connecting means includes a wiring arrangement 154 (see FIGS. 3-5) to electrically connected the switch 150 to the motor 18. The wiring arrangement 154 includes wires 158 extending through a narrow opening 160 in the handle member 70 and connected to the motor 18 by respective connectors 162. The wiring arrangement 154 includes an amount of wire 158 sufficient to accommodate movement of the switch 150 to the extreme pivoted positions (shown in solid and phantom lines in FIG. 3) of the handle member 70 relative to the housing 14. The narrow opening 160 limits the movement of one end of the wires 158 thereby locating the wires 158 during movement of the handle member 70. The connectors 162 limit the movement of other end of wires 158.

In another construction (not shown), the connecting means may include a fixed first conductor mounted on the housing 14 and electrically connected to the motor 18. The first conductor extends along the path of movement of the handle member 70. In this construction, the connecting means also includes a movable second conductor fixed to the handle member 70 and electrically connected to the switch 150. The second conductor is movably connected to the first conductor and moves along the first conductor to thereby maintain the electrical connection between the switch 150 and the motor 18 at any position of the handle member 70 relative to the housing 14.

In yet another construction (not shown), the connecting means may include a remote transmitter and sensor combination to connect the switch 150 to the motor 18. In this construction, the transmitter is fixed to and moves with the handle member 70. The transmitter transmits a signal based on the condition of the switch 150, for example, an "ON" signal or an "OFF" signal. The sensor or receiver is mounted on the housing 14 and electrically connected to the motor 18. The sensor senses the transmitted signal and, if, for example, the "ON" signal is transmitted, connects the motor 18 to the power source. In this construction, the power source is directly connectable to the motor 18, rather than being connected through the switch 150.

A cover 166 is positioned over the motor 18 and the connecting means. In the illustrated construction, the cover 166 includes a channel 170 that accommodates movement of the wires 156 between the extreme pivoted positions (shown in solid and phantom lines in FIG. 3). The channel 170 also insures that the wiring arrangement 154 is protected and not damaged during movement of the handle member 70 relative to the housing 14.

The circular saw 10 also includes (see FIGS. 4-7) means for preventing the switch assembly 142 from connecting the motor 18 to the power source when the locking assembly 82 is in the unlocked condition. Further, the circular saw 10 includes means for preventing the locking assembly 82 from being operated from the locked condition to the unlocked condition when the switch assembly 142 is in the operated condition. The locking assembly 82 and the switch assembly 142 interact to prevent unintentional operation of one assembly when the other assembly is being operated.

The preventing means are provided by a locking plate 174 which interacts with both the locking assembly 82 and the switch assembly 142. The locking plate 174 includes an end 178 for engagement with the tab 122 of the actuating member 102. At the other end, the locking plate 174 includes a blocking portion 182 and an aperture 186. A depressable button 188 is connected to the locking plate 174. The button 188 includes an elongated portion to provide a debris barrier. A spring member 190 biases the locking plate 174 toward engagement with the actuating member 102 (in the direction of arrow B in FIGS. 4 and 5).

As shown in FIG. 5, with the locking assembly 82 in the unlocked condition, the locking plate 174 is moved by the spring member 190 in the direction of arrow B to a position in which the blocking portion 182 engages an upper portion 194 of the trigger 146. In this position, movement of the trigger 146 is prevented, thereby preventing the switch 150 from connecting the motor 18 to the power source.

During movement of the actuating member 102 to the locked position, the tab 122 engages the end 178 and moves the locking plate 174 in the direction opposite to arrow B. Alternatively, the operator depresses the button 188 to move the locking plate 174. Once the actuating member 102 is in the locked position, the end 178 engages in the recess formed on the tab 122.

As shown in FIG. 4, with the locking assembly 82 in the locked condition, the locking plate 174 is in a position in which the upper portion 194 of the trigger 146 is movable into the aperture 186. In this position, the locking plate 174 does not block movement of the trigger 146 and does not prevent the switch 150 from connecting the motor 18 to the power source.

In order to move the actuating member 102 to the unlocked position, the locking plate 174 must be moved in the direction opposite to arrow B. To move the locking plate 174, the operator depresses the button 188, disengaging the end 178 from recess formed on the tab 122. In the illustrated construction, the actuating member 102 cannot be moved to the unlocked position without the operator depressing the button 188. This reduces the likelihood that the actuating member 102 can be accidentally moved to the unlocked position and that the locking assembly 82 can be accidentally released.

In another construction (not shown), the locking plate 174 does not include the button 188. An unlocking force applied by the operator to move the actuating member 102 to the unlocked position causes the tab 122 to move the locking plate 174 in the direction opposite to arrow B. In such a construction, the configuration of the tab 122 would ensure that the required unlocking force is much greater than the force that would be applied if, for example, the operator accidentally pulled on the actuating member 102. This construction also reduces the likelihood of the locking assembly 82 being accidentally unlocked.

In either construction, however, when the trigger 146 is depressed (as shown in solid lines in FIG. 4), the upper portion 194 of the trigger 146 engages the forward wall of the aperture 186, and the locking plate 174 is prevented from moving in the direction opposite to arrow B. Thus, the locking plate 174 provides a means for preventing the locking assembly 82 from being moved from the locked condition to the unlocked condition when the switch assembly 142 is in the operated condition.

With the trigger in the unoperated condition (as shown in phantom lines in FIG. 4), the upper portion 194 of the trigger 146 does not engage the forward wall of the aperture 186. The locking plate 174 can be moved in the direction opposite to arrow B, and the actuating member 102 can be moved to the unlocked position (shown in FIG. 5).

In other constructions (not shown), the preventing means may be provided by other mechanical interaction between the locking assembly 82 and the switch assembly 142. For example, the preventing means may be provided by direct interaction (not shown) between the trigger 146 and the actuating member 102 without an additional component such as the locking plate 174.

In yet other constructions, the preventing means may be provided by non-mechanical means, such as by additional electrical switches which must be operated to enable operation of the locking assembly 82 and/or the switch assembly 142. For example, the locking assembly 82 can include a switch (not shown) electrically connected to the switch 150. This additional switch would prevent the switch 150 from connecting the motor 18 to the power source when the locking assembly 82 is in the unlocked condition.

In the illustrated construction, the switch assembly 142 also includes (see FIGS. 3-7, 8A and 8B) a shuttle switch 198 for further preventing unintentional operation of the trigger 146, thereby further preventing unintentional operation of the switch 150 and the motor 18. The shuttle switch 198 is supported for lateral movement (in the direction of arrow C in FIGS. 8A and 8B) two ribs 202 and defines three pockets 206. A biasing member 210 (see FIG. 6) biases the shuttle switch 198 to a centered position (as shown in FIG. 8A).

Figure 8A:
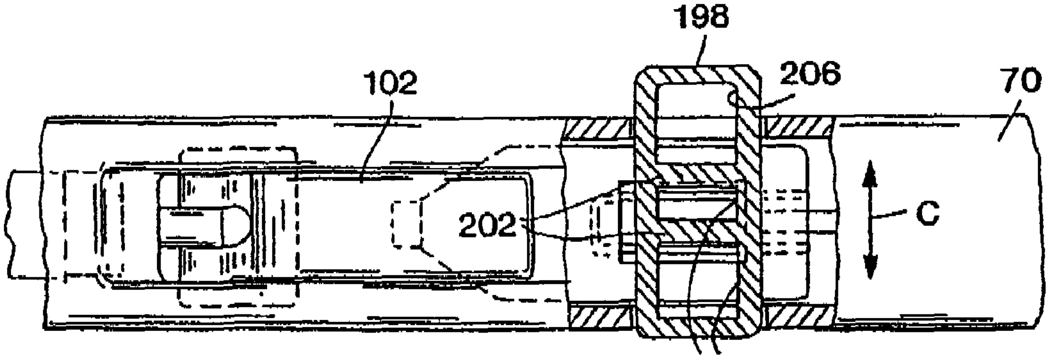
FIG. 8A is a view taken generally along line 8A-8A in FIG. 6.
Figure 8B:
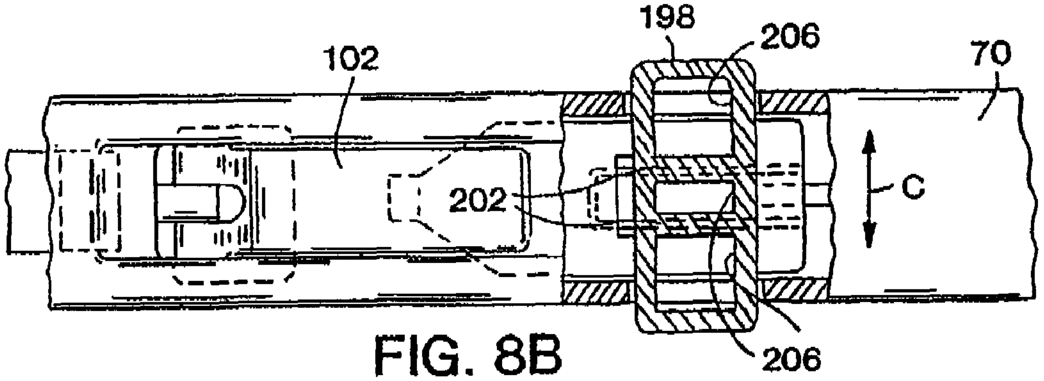
FIG. 8B is a view similar to that shown in FIG. 8A and illustrating the shuttle switch in a lateral position.
Figure 6:
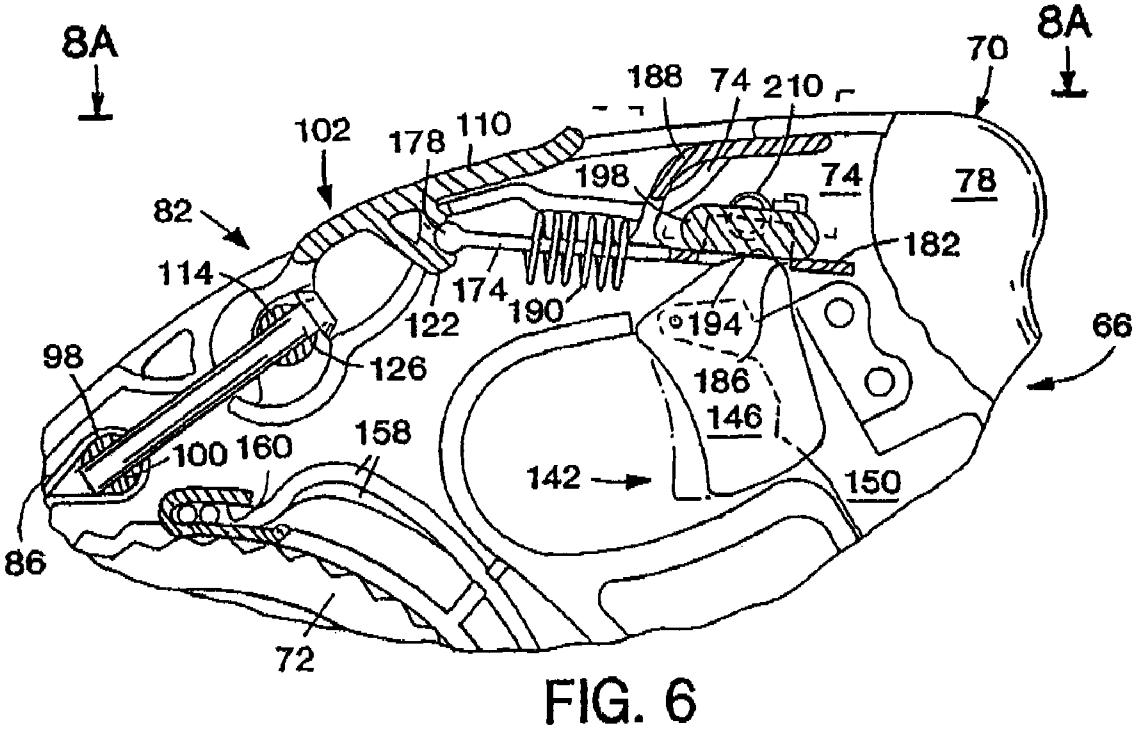
FIG. 6 is an enlarged partial cross sectional view of a portion of the handle arrangement shown in FIG. 4.
Figure 7:
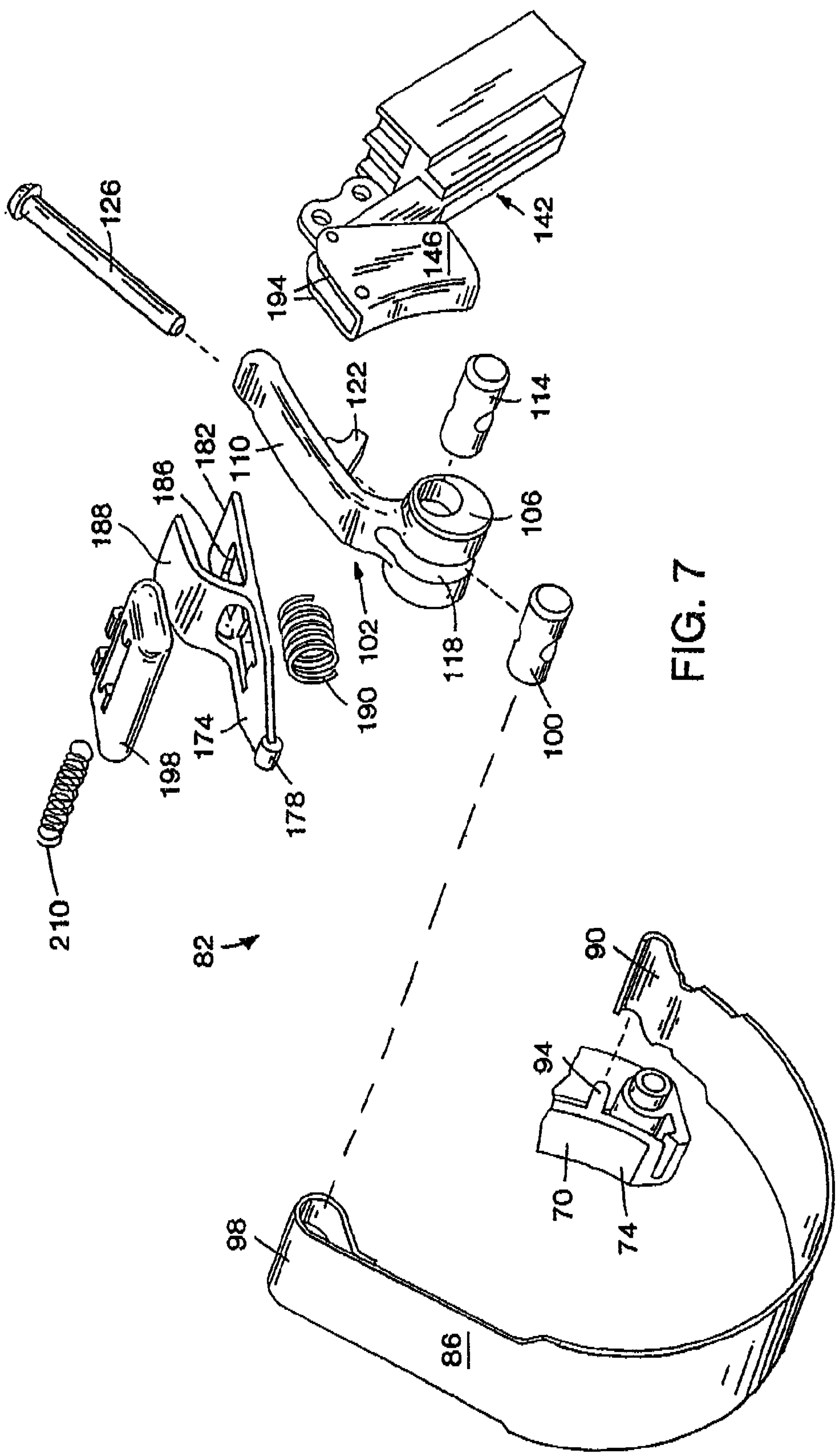
FIG. 7 is an exploded perspective view of a portion of the handle arrangement shown in FIG. 4.

With the shuttle switch 198 in the centered position (as shown in FIG. 8A), the upper portion 194 of the trigger 146 contacts the ribs 202, preventing the switch 150 from connecting the motor 18 to the power source. To operate the switch 150, the shuttle switch 198 must first be moved laterally (in the direction of arrow C in FIGS. 8A and 8B) against the force of the biasing member 210. With the shuttle switch 198 in a lateral position (such as that shown in FIG. 8B), the upper portion 194 of the trigger 146 does not contact the ribs 202 but passes into the pockets 206 defined between the ribs 202. The trigger 146 can thus operate the switch 150 to connect the motor 18 to the power source. It should be understood that the shuttle switch 198 can also be to a lateral position opposite to that shown in FIG. 8B to allow movement of the trigger 146.

Movement of the shuttle switch 198 to a lateral position (such as that shown in FIG. 8B) does not affect operation of the trigger 146 when the locking assembly 82 is in the unlocked condition (as shown in FIG. 5). Further, with the locking assembly 82 in the locked condition, the shuttle switch 198 must also be moved to the position shown in FIGS. 4 and 8B to allow the trigger 146 to be operated.

Figure 2:
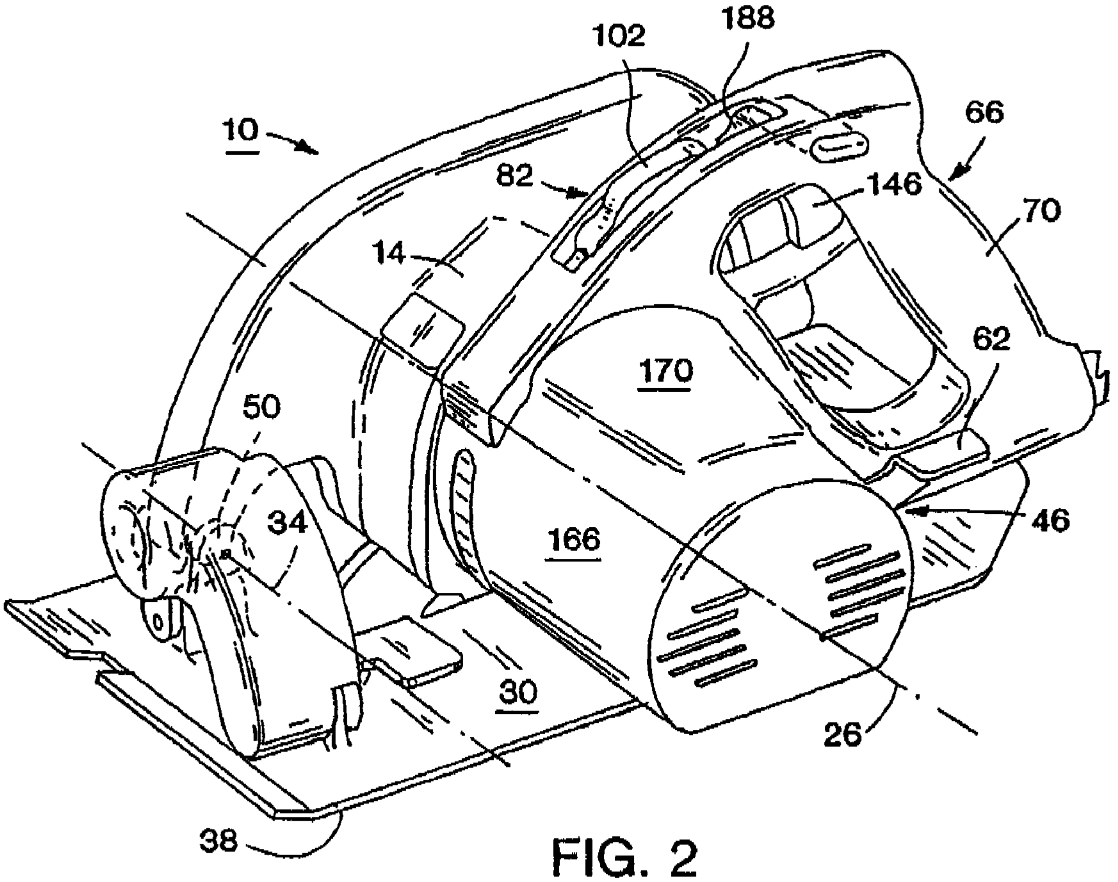
FIG. 2 is a perspective view of the power tool shown in FIGS. 1A-1C.

In operation, the operator selects the desired position of the handle member 70 relative to the housing 14 and ensures that the locking assembly 82 is in the locked condition as shown in FIGS. 1A, 2 and 4. The operator then operates the circular saw 10 to cut the workpiece W.

When the operator wants to change the position of the handle member 70 relative to the housing 14, for example, when the depth of cut of the saw blade 22 is adjusted, the operator first moves the switch assembly 142 to the unoperated condition by releasing the trigger 146.

The operator can then move the locking assembly 82 to the unlocked condition. The button 188 is depressed, and the actuating member 102 is moved to the unlocked position (as shown in FIG. 5) so that the locking member 86 does not apply a clamping force to the support portion 72 of the housing 14 and the inter-engaging teeth 130 are disengaged. The handle member 70 is then moved to the desired position relative to the housing 14, and the locking assembly 82 is moved to the locked condition. The locking member 86 applies the clamping force to the support portion 72 of the housing 14, and the inter-engaging teeth 130 are engaged. To continue cutting operations, the operator then moves the shuttle switch 198 to a lateral position (such as that shown in FIG. 8B), and depresses the trigger 146 to operate the motor 18 and cut the workpiece W.

As shown in FIGS. 1A-1C, the operator can adjust the handle member 70 after the depth of cut of the saw blade 22 has been adjusted to maintain a "push handle" orientation (illustrated in FIGS. 1A and 1C). The operator can also adjust the position of the handle member 70 to provide additional comfort to the operator. For example, if the operator is cutting a workpiece W that is positioned lower than the operator's waist, the operator might prefer a top handle position and may thus move the handle member 70 upwardly. Alternatively, in some cutting operations, the operator may prefer the "push handle" orientation to the "top handle" orientation. The operator can then move the handle member 70 from the higher "top handle" orientation to the lower "push handle" orientation.

Figure 9:
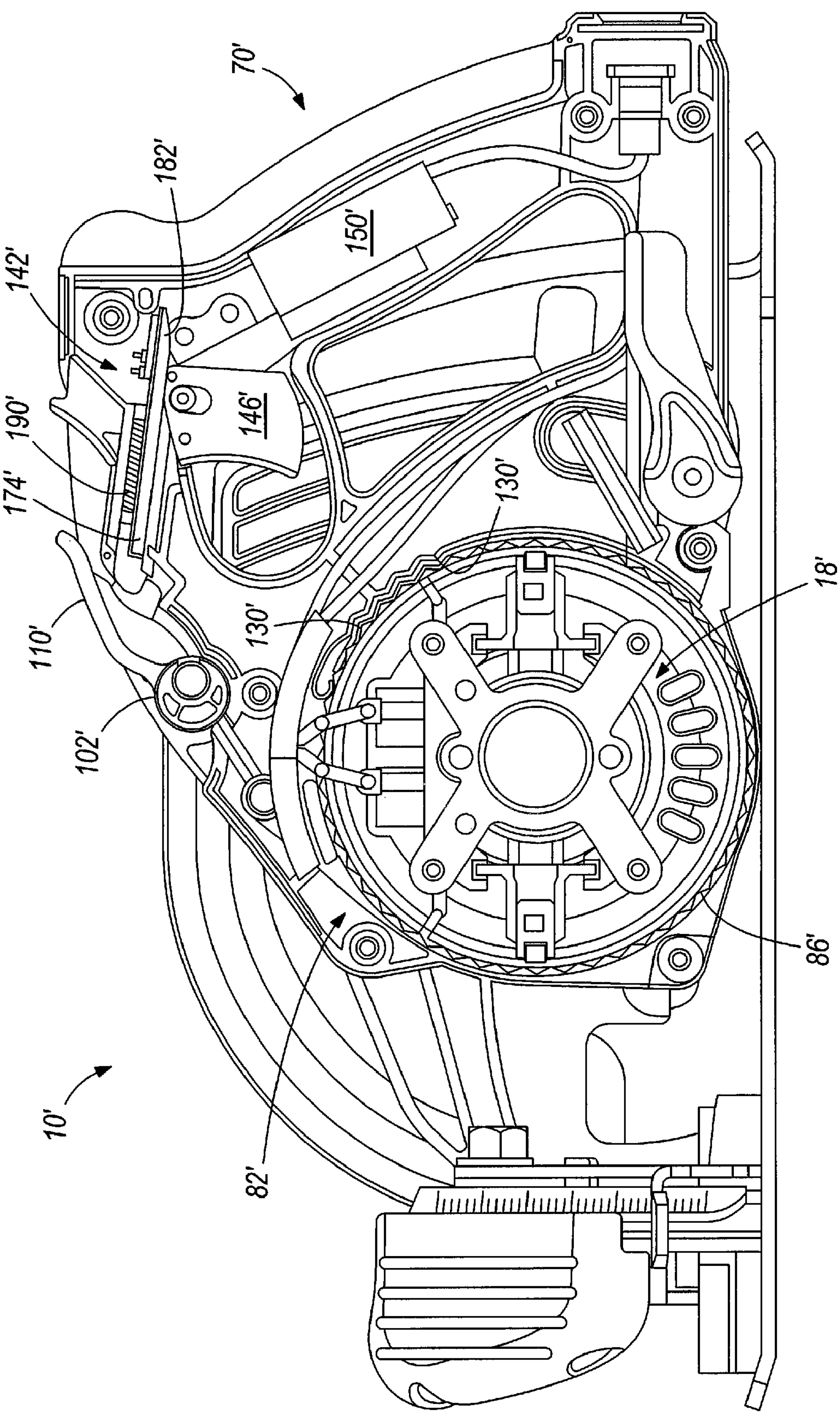
FIG. 9 is a side cross-sectional view of an alternative construction of the power tool shown in FIGS. 1-8.

Another construction of a power tool, such as a circular saw 10', is illustrated in FIG. 9. The circular saw 10' is similar to the circular saw 10 shown in FIGS. 1-8, with specific reference being made to FIG. 4. In the construction shown in FIG. 9, common elements have the same reference number "'".

With reference to FIG. 9, the relationship between the switch assembly 142' and locking assembly 82' is generally the same as in FIG. 4. When the locking assembly 82' is unlocked to allow movement of the handle member 70', the switch assembly 142' cannot be operated to connect the motor 18' to the power source (not shown). Also, when the switch assembly 142' is operating to connect the motor 18' to a power source, the locking assembly 82' cannot be unlocked to allow movement of the handle member 70'.

There are differences in the arrangement and construction of the components in the constructions shown in FIG. 9 when compared to the arrangement shown in FIG. 4, but the functions and operations performed remain substantially the same. As shown in FIG. 9, the actuating member 102' does not include a tab (such as the tab 122 shown in FIGS. 4-7), and the interface and inter-engagement between the actuating member 102' and the locking plate 174' is different. Also, the locking plate 174' somewhat houses the biasing spring 190'. In addition, in the illustrated construction, the switch assembly 142' does not include a shuttle switch (such as the shuttle switch 198 shown in FIGS. 4-8).

Figure 10:
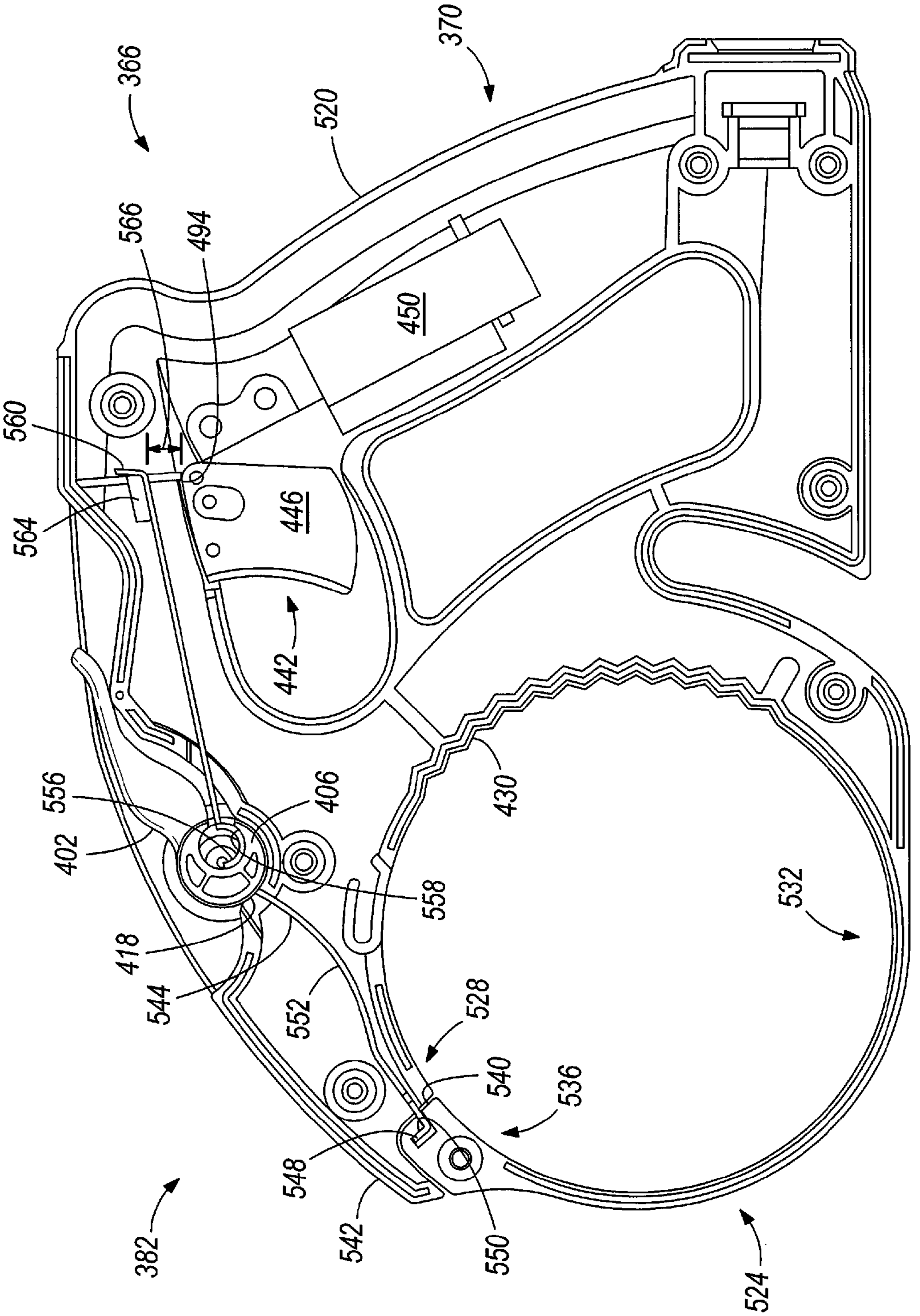
FIG. 10 is a partial side cross-sectional view of an alternative construction of a handle arrangement for a power tool shown in FIGS. 1-9 and illustrating the actuating member in the locked position.
Figure 11:
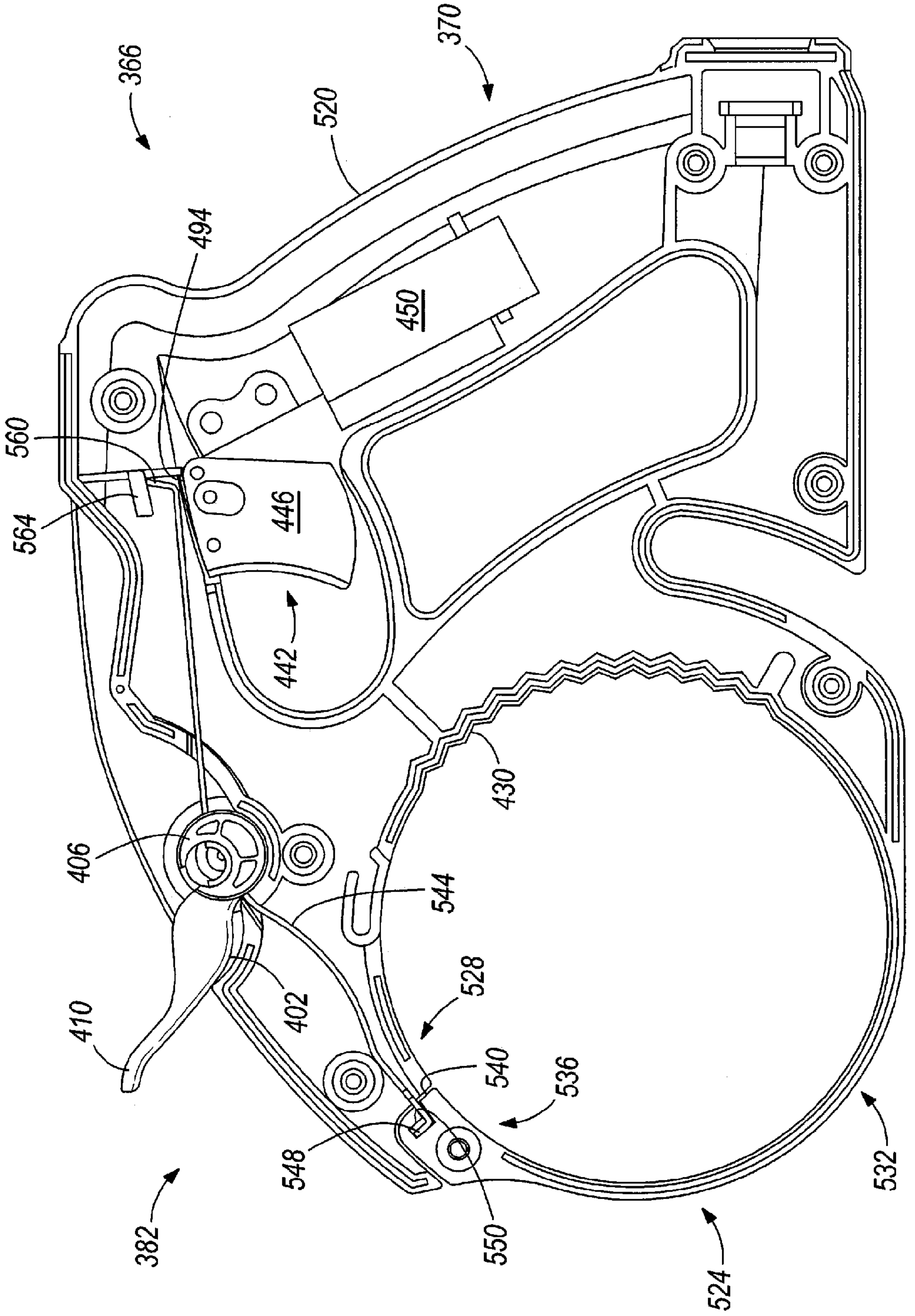
FIG. 11 is a partial side cross-sectional view of the handle arrangement shown in FIG. 10 and illustrating the actuating member in the unlocked position.

FIGS. 10-11 illustrate an alternative construction of a movable handle arrangement 366 for a power tool (not shown but similar to the power tool (the circular saw 10 or 10') shown in FIGS. 1-6 and in FIG. 9). The handle arrangement 366 is similar to that shown in FIGS. 1-8 and in FIG. 9, and common elements have the same reference number increased by 300.

As shown in FIGS. 10-11, in the illustrated construction, the handle member 370 extends substantially about the full circumference of the motor (not shown but similar to the motor 18 shown in FIG. 3) and of the support portion of the housing (not shown but similar to the support portion 72 of the housing 14 shown in FIGS. 3-6). In this construction, the handle member 370 incorporates the locking member 86 (e.g., the band member) illustrated in FIGS. 3-7.

The handle member 370 generally includes a hand grip portion 520 and a handle support portion 524. The support portion 524 generally has a first end 528 on the main body of the handle member 370, an intermediate portion 532, and a second end 536 facing the first end 528 across a split, slot or seam 540. The intermediate portion 532 is flexible to allow the split 540 to increase and decrease in size. A portion 542 of the first end 528 overlaps the second end 536 and the split 540.

The locking assembly 382 is operable to lock the handle member 370 in a desired position on the power tool. In FIG. 10, the locking assembly 382 is illustrated in the locked condition, in which the handle member 370 is locked in a desired position on the power tool, and, in FIG. 11, in the unlocked condition, in which the handle member 370 is movable. In the illustrated construction, the locking assembly 382 provides both a frictional engagement, through the clamping force applied by handle support portion 524 to the support portion of the housing, and a positive engagement, through the inter-engaging teeth 430 (shown in the handle support portion; as discussed above, complementary teeth 130 are formed on the support portion 72 of the housing 14). As discussed above, in other constructions (not shown), however, the locking assembly 382 may only provide either a frictional engagement or a positive engagement.

In the illustrated construction, the locking assembly 382 also incorporates features of the structure to prevent the switch assembly 442 from connecting the motor to the power source when the locking assembly 382 is in the unlocked condition and of the structure to prevent the locking assembly 382 from being operated from the locked condition to the unlocked condition when the switch assembly 442 is in the operated condition. The locking assembly 382 and the switch assembly 442 interact to prevent unintentional operation of one assembly when the other assembly is being operated.

The locking assembly 382 includes structure to open and close the split 540 and to provide an interlock between the locking assembly 382 and the switch assembly 442. The structure includes an interlock drawbar 544. At one end (e.g., the locking end), the interlock drawbar 544 has a connector or hook 548 engageable in a recess 550 in the second end 536 of the handle support portion 524. A spring portion 552 allows flexing of the drawbar 544 and applies a biasing force. The spring portion 552 may also accommodate manufacturing tolerances.

The drawbar 544 engages the cam portion 406 of the actuating member 402, extending through the annular opening 418. An intermediate portion 556 of the drawbar 544 engages the surface of an eccentric through-opening 558 in the cam portion 406 to cause movement of the drawbar 544 when the actuating member 402 is moved. At the other end of the drawbar 544 (e.g., the interlock end), a locking portion or hook 560 cooperates with a ramp portion 564 formed on the handle member 370.

In the locked condition (shown in FIG. 10), the actuating member 402 is in the locked position. The locking end of the drawbar 544 draws the second end 536 of the handle support portion 524 toward the first end 528 to close the split 540 (by engagement of the hook 548 with the wall of the recess 552). In this condition, the handle support portion 524 applies a frictional force to the support portion of the housing. Also, the inter-engaging teeth 430 are engaged to provide a positive locking force to resist movement of the handle member 370 on the power tool.

In the unlocked condition (shown in FIG. 11), the actuating member 402 is in the unlocked condition. The locking end of the drawbar 544 moves to the left (in FIG. 11), allowing and/or forcing (by engagement of the hook 548 with the opposite wall of the recess 552) the second end 536 of the handle support portion 524 to move away from the first end 528 to open the split 540. In this condition, the frictional force applied by the handle support portion 524 on the support portion of the housing is reduced or removed, and the inter-engaging teeth 430 can pass each other. The handle member 370 is then movable on the power tool.

In the locked condition (shown in FIG. 10), the hook 560 on the interlock end of the drawbar 544 is moved to the right (in FIG. 10) beyond the ramp portion 564 so that there is a vertical clearance 566 between the interlock end of the drawbar 544 and the upper portion 494 of the trigger 446. With the interlock drawbar 544 in this position, the trigger 446 can be pivoted (e.g., to the "on" position) to operate the on/off switch 450 so that the switch assembly 442 can connect the motor to the power source.

When the trigger 446 is pivoted to the "on" position and into the space of the vertical clearance 566, the upper end 494 of the trigger 446 will impede movement of the hook 560 downwardly. Accordingly, because of the continued engagement of the hook 560 with the ramp portion 564, the drawbar 544 is restrained from being moved to the unlocked condition.

When the trigger is pivoted to the "off" position (as shown in FIGS. 10-11), there is vertical clearance 566 between the interlock end of the drawbar 544 and the upper end 494 of the trigger 446. When the actuating member 402 is pivoted toward the unlocked position (toward the position shown in FIG. 11), the hook 560 can move downwardly (and into the space of the vertical clearance 566) and to the left (in FIG. 11) relative to the ramp portion 564 so that the drawbar 544 can move to the unlocked condition, described above, and so that the handle member 370 is movable relative to the power tool.

When the interlock end of the drawbar 544 is in the unlocked position (shown in FIG. 11), the vertical clearance 566 between the interlock end of the drawbar 544 and the upper end 494 of the trigger 446 is reduced or eliminated. Accordingly, in the unlocked condition, the interlock end of the drawbar 544 will impede movement of the trigger 446 to the "on" position to prevent the switch assembly 442 from connecting the motor to the power source.

In this construction, when the locking assembly 382 is between the locked and unlocked conditions, pivoting the trigger 446 toward the "on" position will tend to move the locking assembly 382 to the locked condition. In this case, the upper portion 494 of the trigger 446 will engage the interlock end of the drawbar 544 and force the hook 560 to the right (in FIGS. 10-11) and past the ramp 564 and upwardly. This movement will cause the locking end of the drawbar 544 to close the split 540.

In the illustrated construction, the arrangement and construction of the locking assembly 382, including the drawbar 544, eliminates several components of the above-described constructions which may, for example, reduce costs of manufacture, simplify assembly and/or operation, improve durability, etc. However, in other constructions (not shown), the interlock drawbar 544 may be formed as separate portions (a locking member and an interlock member) connected at the cam portion 406 of the actuating member 402.

Figure 12A:
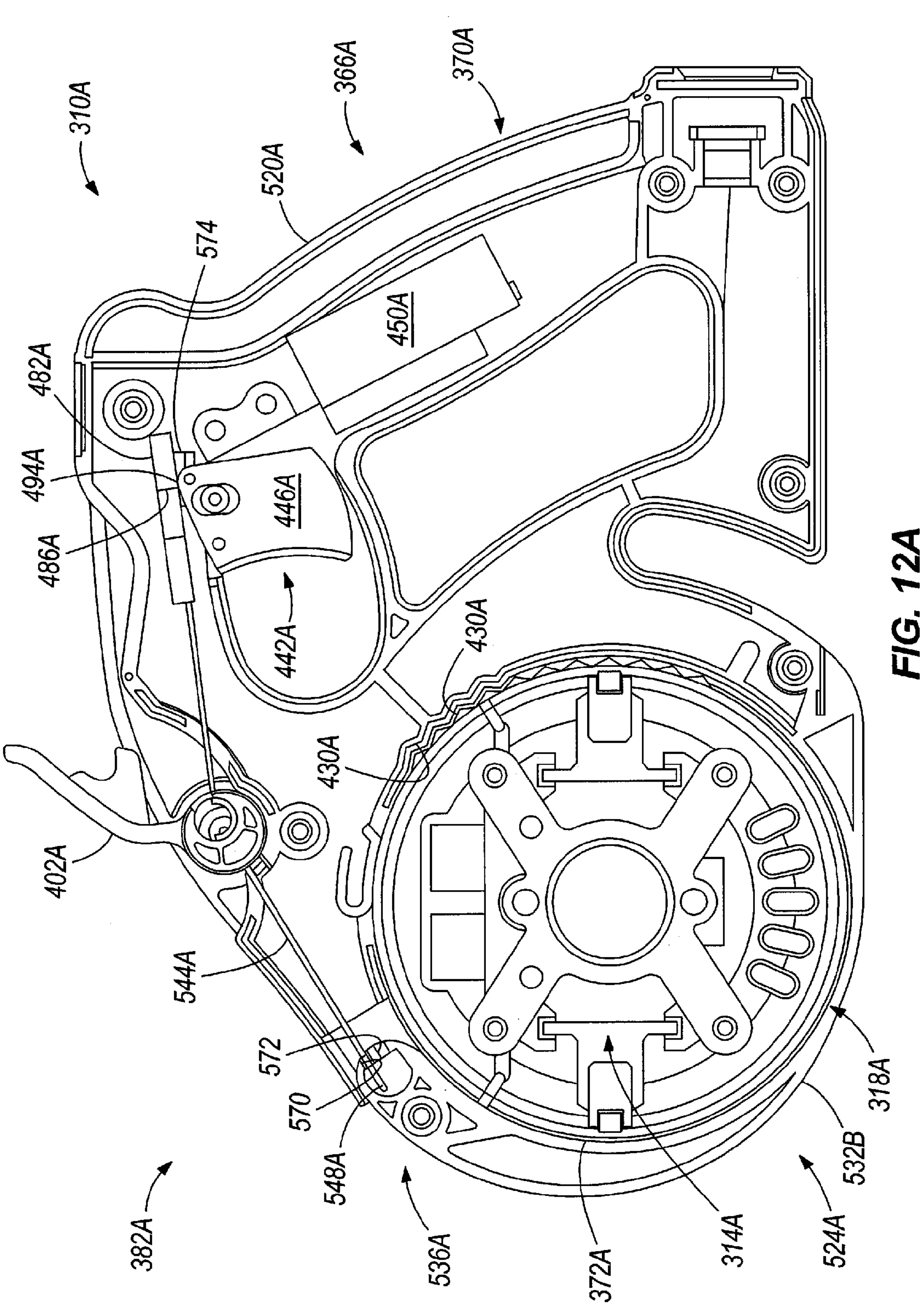
FIG. 12A is a partial side cross-sectional view of an alternative construction of the handle arrangement shown in FIGS. 10-11 and of the power tool shown in FIGS. 1-9.

Another construction of a portion of a power tool, such as a circular saw 310A, is illustrated in FIG. 12A. The circular saw 310A is similar to the circular saw 10 shown in FIGS. 1-8, with specific reference being made to FIG. 4. The circular saw 310A includes a movable handle arrangement 366A which is similar to the handle arrangement 366 shown in FIGS. 10-11, and, in the construction shown in FIG. 12A, common elements have the same reference number "A".

Figure 12B:
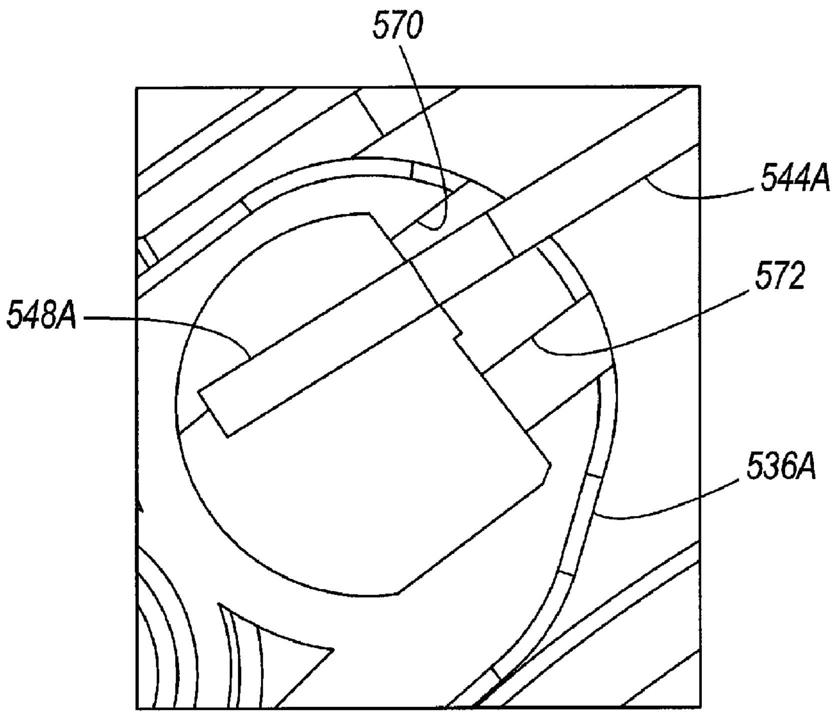
FIG. 12B is an enlarged partial cross-sectional view of a portion of the handle arrangement shown in FIG. 12A illustrating the end of the one-piece stamping in the stepped slots.

In the illustrated construction, the interlock drawbar 544A is a one-piece stamping. The connector 548A on the locking end of the drawbar 544A is positioned and retained in (see FIG. 12B) a stepped slot 570 or 572 formed in the second end 536A of the support portion 524A. The connector 548A flares out to be trapped by the stepped slot 570 or 572.

When the connector 548A is in the first stepped slot 570, the handle support portion 524A is movable to apply a first force to the support portion 372A of the housing 314A, and, when the connector 548A is in the second stepped slot 572, the handle support portion 524A is movable to apply a second force to the support portion 372A. The stepped slots 570 and 572 enable the force applied by the handle support member 524A to be adjustable, for example, to provide factory and service adjustability.

As shown in FIG. 12A, the interlock end of drawbar 544A is guided in a slot 574 on the handle member 370A. With a construction similar to that shown in FIGS. 4-7, the interlock end includes a blocking portion 482A which, in the unlocked condition, is engageable with the upper portion 494A of the trigger 446A to prevent movement of the trigger 446A, thereby preventing the switch 450A from connecting the motor 318A to the power source. The interlock end also defines an aperture 486A into which, in the locked condition, the upper portion 494A of the trigger 446A is movable such that the interlock end of the drawbar 544A does not block movement of the trigger 446A and does not prevent the switch 450A from connecting the motor 318A to the power source.

When the trigger 446A is depressed, the upper portion 494A of the trigger 446A engages the forward wall of the aperture 486A, and the drawbar 544A is prevented from moving to the unlocked position (to the left in FIG. 12A). With the trigger 446A in the un-operated condition, the upper portion 494A of the trigger 446A does not engage the forward wall of the aperture 486A, and the drawbar 544A can be moved to the unlocked position (to the left in FIG. 12A).

Figure 12C:
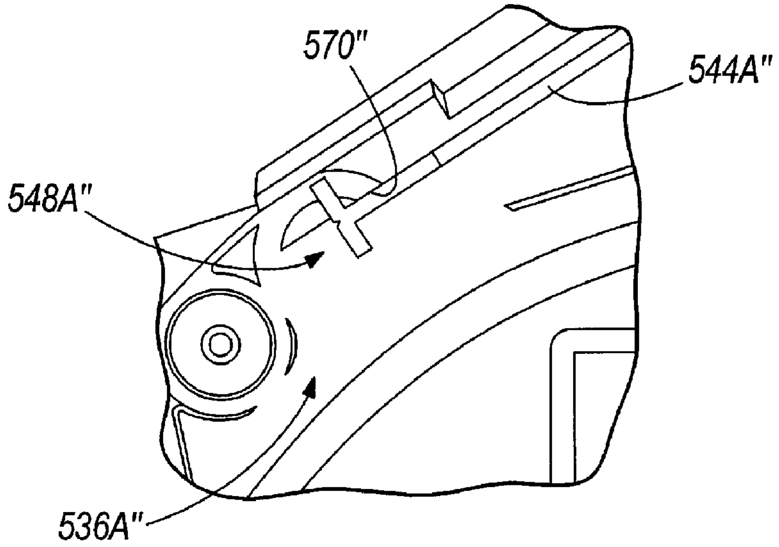
FIG. 12C is an alternative construction of the ends of the one-piece stamping shown in FIG. 12B.

An alternative construction of the locking end of the drawbar 544A" is illustrated in FIG. 12C. The construction is similar to the locking end of the drawbar 544A shown in FIGS. 12A-12B, and common elements have the same reference number """.

In the illustrated construction, the connector 548A" has a T-shape. The connector 548A" is laterally movable into one of the slots 570" (one shown), and the T-shaped connector 548A" prevents the locking end of the drawbar 544A" from moving axially through the slot 570".

Figure 13:
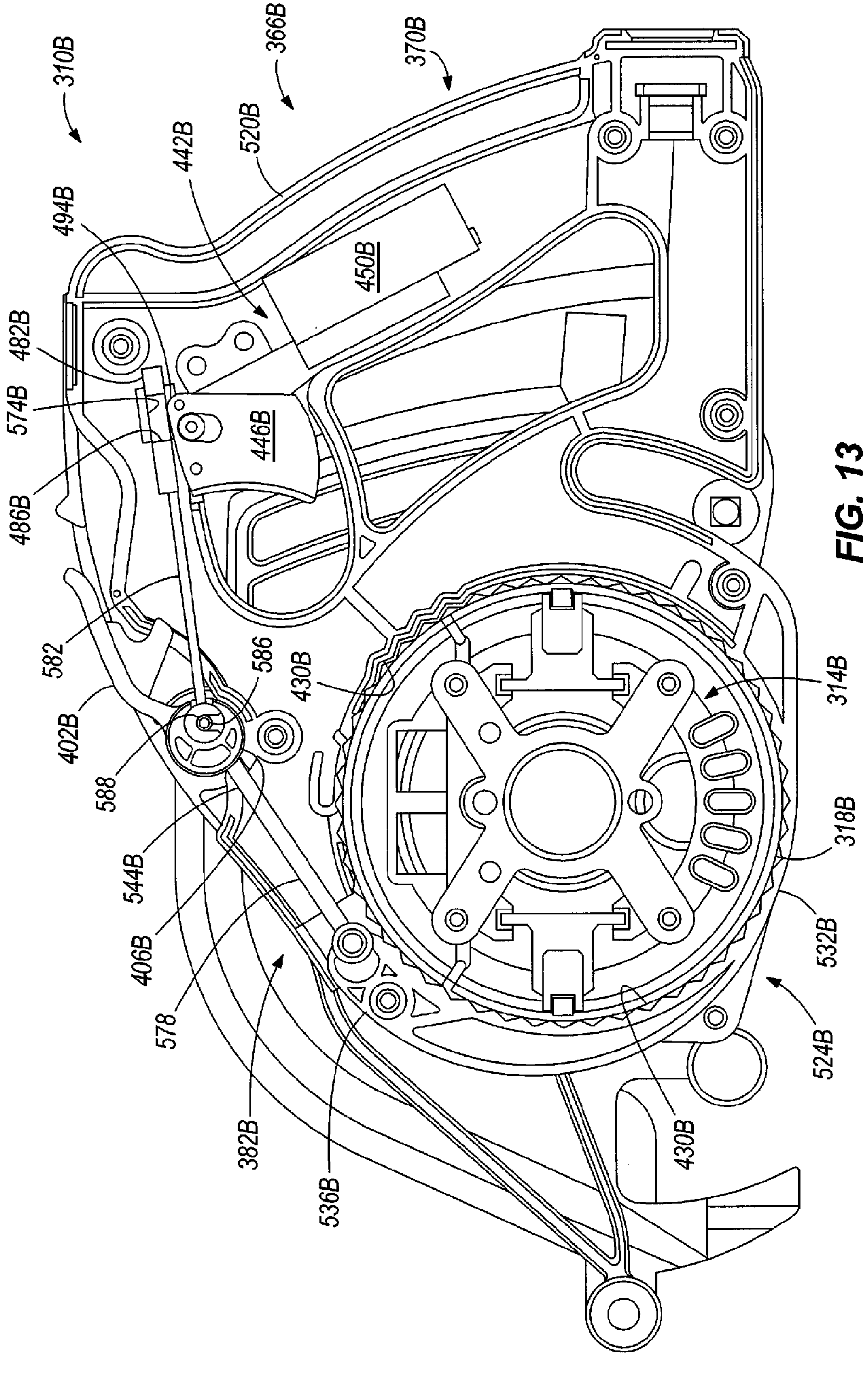
FIG. 13 is a partial side cross-sectional view of an alternative construction of the handle arrangement and power tool shown in FIG. 12A.

Another construction of a portion of a power tool, such as a circular saw 310B, is illustrated in FIG. 13. The circular saw 310B is similar to the circular saw 10 shown in FIGS. 1-8, with specific reference being made to FIG. 4. The circular saw 310B includes a movable handle arrangement 366B which is similar to the handle arrangement 366 and 366A shown in FIGS. 10-11 and in FIG. 12A, and, in the construction shown in FIG. 13, common elements have the same reference number "B".

In the construction illustrated in FIG. 13, the interlock drawbar 544B is an assembly of a locking portion 578, which may be similar to the locking end of the drawbar 544, 544A or 544A' (shown in FIG. 10-11, 12A or 13), and an interlock portion 582, which is similar to the interlock end of the drawbar 544A (shown in FIG. 12A). The portions 578 and 582 include connectors 586 and 588, respectively, which are connected at the cam portion 406B of the actuating member 402B.

FIGS. 14-28 illustrate several constructions of a bevel angle detent mechanism for a saw. A bevel angle adjustment mechanism for saw, such as a circular saw, is illustrated in U.S. Pat. No. 6,301,789, issued Oct. 16, 2001, the entire contents of which is hereby incorporated by reference.

Figure 14A:
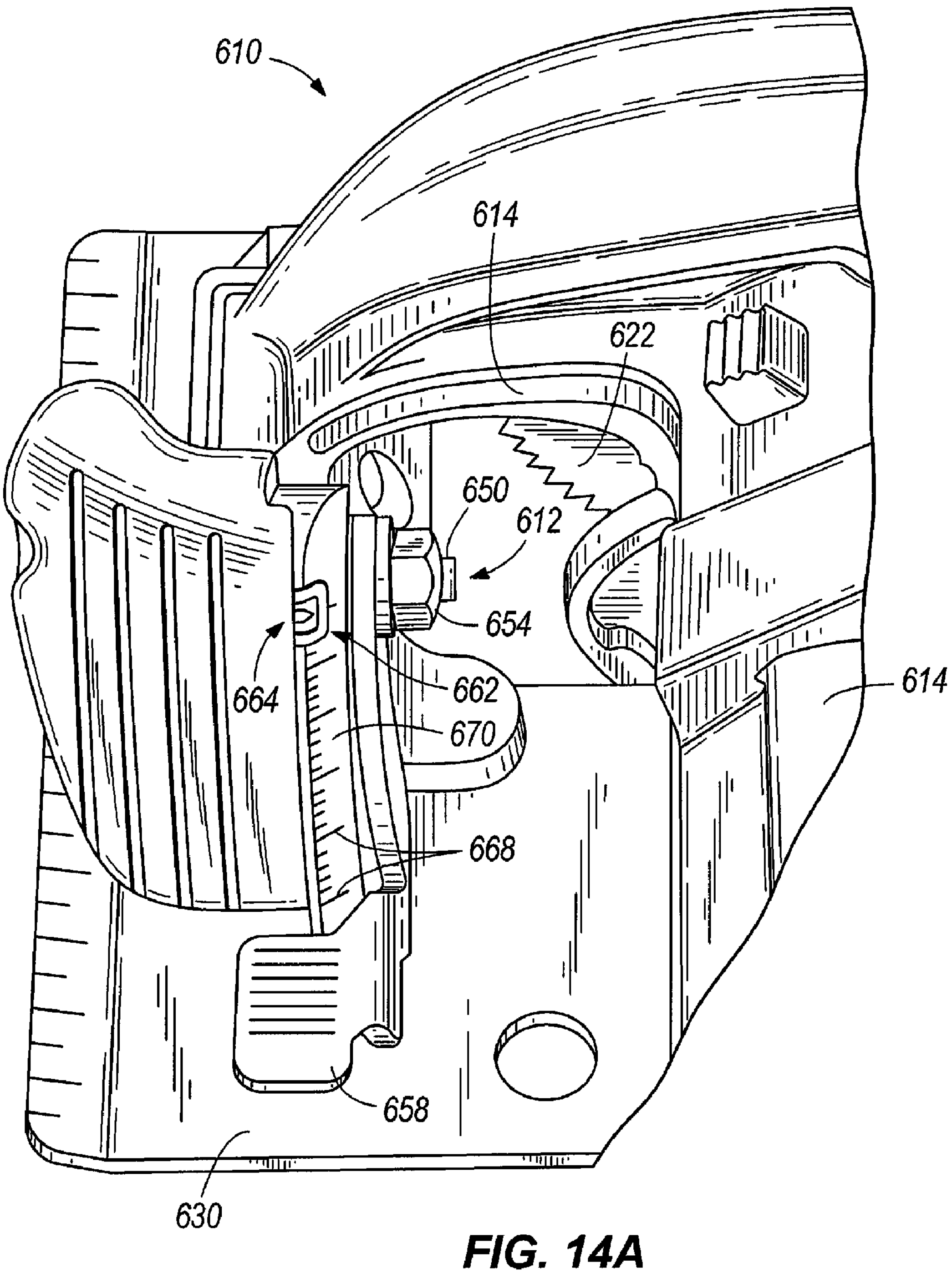
FIG. 14A is a side view of a bevel angle adjustment mechanism for the circular saw.

FIG. 14A illustrates a saw, such as a circular saw 610, including a bevel angle adjustment mechanism 612 for adjusting the angle between the cutting plane of the saw blade 622 relative to the surface of the work piece W (not shown), the bevel angle. The bevel angle adjustment assembly 612 pivotally connects the saw blade 622 (and the housing assembly 614) to the shoe plate 630.

Figure 14B:
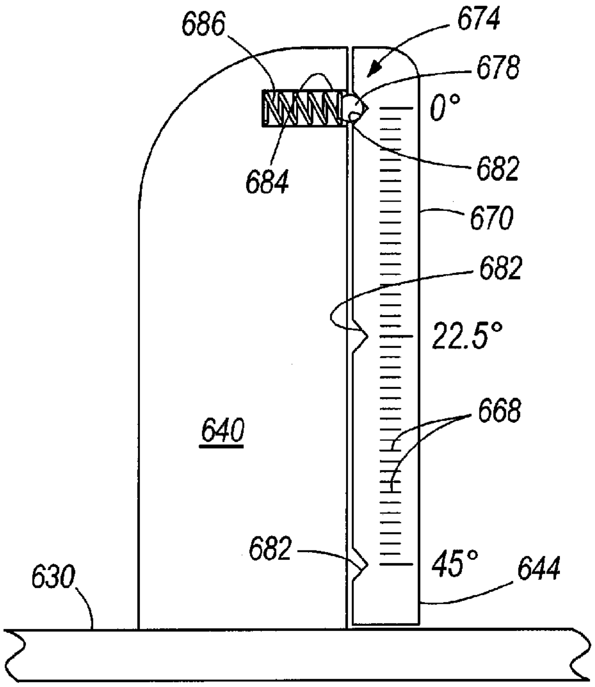
FIG. 14B is a side view of one construction of a bevel angle detent mechanism of the bevel angle adjustment mechanism of FIG. 14A.

In the illustrated construction, the bevel angle adjustment assembly 612 generally includes a pivot member (not shown) pivotally connecting the shoe plate 630 to the housing assembly 614 for movement about a bevel axis (not shown). As shown in FIG. 14B, a bevel housing or support post 640 extends upwardly from the shoe plate 630, and a bevel bracket or bevel plate 644 is connected to the housing assembly 614 so that the bevel plate 644 is movable with the housing assembly 614 relative to the shoe plate 630. An arcuate groove (not shown but similar to the arcuate groove 646C shown in FIG. 19) is defined in the bevel plate 644.

As shown in FIG. 14A, a first connecting member or fastener 650 extends through the support post 640 and through the arcuate groove 646 in the bevel plate 644 to connect the support post 640 to the bevel plate 644. A second connecting member or locking nut 654 is threadedly connected to the fastener 650 and is operable to apply a clamping force to the bevel plate 644 to fix the bevel plate 644 to the support post 640.

The bevel angle adjustment assembly 612 also includes a locking actuator or lever 658 connected to the nut 654. The locking lever 658 is movable between a locking position, in which the bevel angle of the saw blade 622 is fixed, and an unlocked position, in which the bevel angle of the saw blade 622 is adjustable.

In the locked position, the nut 654 applies a clamping force to the bevel plate 644 so that the bevel plate 644 is fixed to the support post 640. The housing assembly 614 is fixed relative to the shoe plate 630, and the bevel angle of the saw blade 622 is fixed. In the unlocked position, the nut 654 does not apply a clamping force to the bevel plate 644, and the fastener 650 is movable in and along the arcuate groove 646. The bevel plate 644 is movable relative to the support post 640, and the housing assembly 614 is movable relative to the shoe plate 630 to adjust the bevel angle of the saw blade 622.

The bevel angle adjustment assembly 612 also includes an indicator 662 for indicating the bevel angle of the saw blade 622. The indicator 662 includes a first indicator member or pointer 664 fixed to the shoe plate 630 and a plurality of second indicator members 668 fixed to the housing assembly 614. In the illustrated construction, the second indicator members 668 are formed on a scale 670 formed on the bevel plate 644. To indicate the bevel angle, the pointer 664 is aligned with one of the second indicator members 668.

To adjust the bevel angle of the saw blade 622, the locking lever 658 is moved from the locked position to the unlocked position. The housing assembly 614 is moved relative to the shoe plate 630 until the saw blade 622 is in the desired bevel angle position (as indicated by the alignment of the pointer 664 with the selected second indicator member 668). Once the operator has positioned the saw blade 622 in the desired bevel angle position, the locking lever 658 is moved to the locked position so that the nut 654 clamps the bevel plate 644 to the support post 640.

The bevel angle adjustment mechanism 612 may also include a bevel angle detent mechanism which is operable to position the saw blade 622 in a number of predetermined bevel angle positions (e.g., 0°, 22.5°, 45°). FIGS. 14B-14C and FIGS. 15-28 illustrate several alternative constructions of a bevel angle detent mechanism in more detail.

FIG. 14B illustrates one construction of a bevel angle detent mechanism 674. The bevel angle detent mechanism 674 cooperates with the support post 640 and the bevel plate 644. A detent member 678 is supported on and for movement with one of the support post 640 and the bevel plate 644 (e.g., on the support post 640), and depressions or recesses 682 are defined in the other of the support post 640 and the bevel plate 644 (e.g., on the bevel plate 644) at predetermined locations corresponding to predetermined bevel angle positions (e.g., recesses 682*a*, 682*b*, 682*c* corresponding to bevel angle positions 0°, 22.5°, 45°, respectively). The detent member 678 is engageable in one of the recesses 682 to position the saw blade 622 in the corresponding predetermined bevel angle position (e.g., in recess 682*a* corresponding to the 0° bevel angle position).

The support post 640 defines a recess 684 in which a spring 686 (and a portion of the detent member 678) is supported. The spring 686 is in contact with the detent member or detent ball 678 and biases the detent ball 678 toward the face of the bevel plate 644 so that, when aligned, the detent ball 678 will engage a recess 682 to position the support post 640 and the bevel plate 644 (and the shoe plate 630 and the saw blade 622) in a predetermined bevel angle position.

Figure 14C:
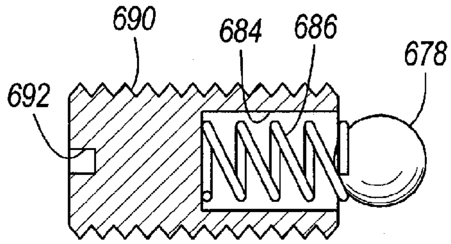
FIG. 14C is an enlarged partial cross-sectional view of a bevel detent of the bevel angle detent mechanism shown in FIG. 14B.

FIG. 14C illustrates an alternative construction for the support of the detent member 678. In the illustrated construction, a threaded housing 690 defines the recess 684 and supports the spring 686 (and at least a portion of the detent ball 678). Although not shown, the outer rim of the housing 690 may limit outward movement of the detent ball 678 to form a self-contained assembly. In such a construction, the structure supporting the detent member 678 (e.g., the support post 640) would define a threaded recess (not shown) for receiving the threaded housing 690 (or the assembly of the threaded housing 690, spring 686 and detent ball 678) to support the detent ball 678 in the position illustrated in FIG. 14B.

A slot 692 is provided on the closed end surface of the threaded housing 690 to provide for engagement with a tool such as a screwdriver to connect the threaded housing 690 to the support post 640. The threaded housing 690 may be threaded into and out of the support post 640 to adjust the force of the spring 686 on the detent ball 678 and, thereby, to adjust the force of the detent ball 678 on the bevel plate 644 and/or in a recess 682.

Figure 15:
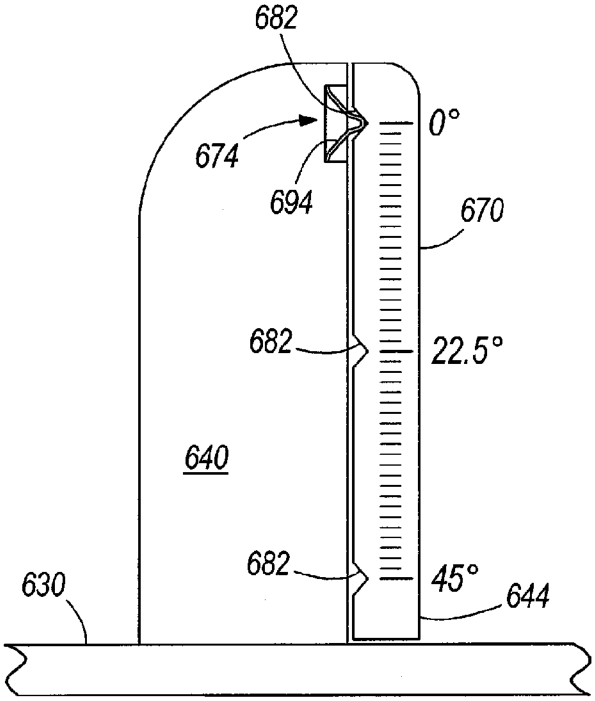
FIG. 15 is a side view of another construction of a bevel angle detent mechanism of the bevel angle adjustment mechanism of FIG. 14A.

FIG. 15 illustrates an alternative construction of the detent member 678. In the illustrated construction, the detent member 678 is provided by an end of a spring member 694, such as a steel spring stamping, which is preloaded between the support post 640 and the bevel plate 644. The spring member 694 incorporates the detent member 678 and the spring 686. When aligned, the end (the detent member 678) of the spring member 694 engages a recess 682 to position the support post 640 and the bevel plate 644 (and the shoe plate 630 and the saw blade 622) in the corresponding predetermined bevel angle position.

Figure 16:
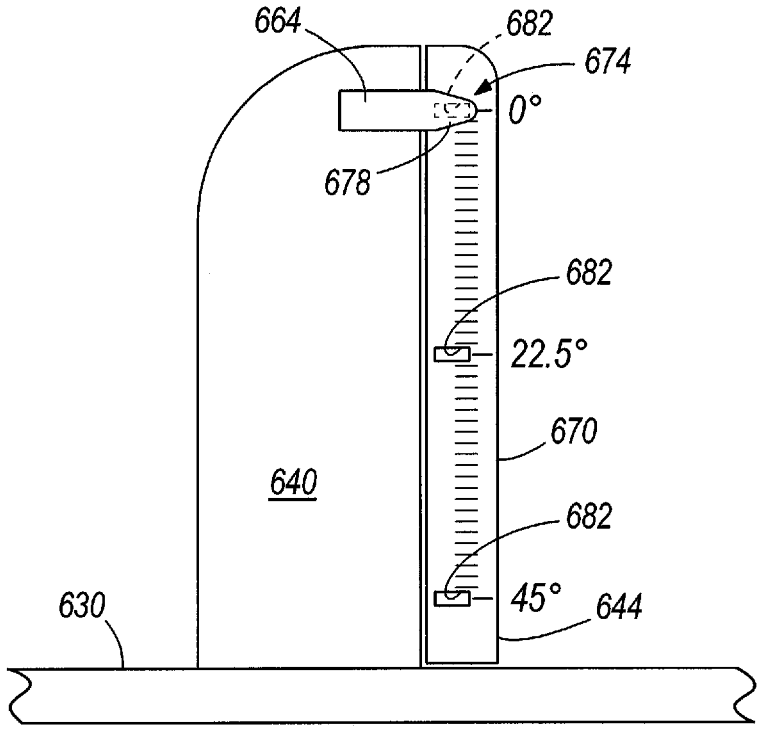
FIG. 16 is a side view of yet another construction of a bevel angle detent mechanism of the bevel angle adjustment mechanism of FIG. 14A.
Figure 17:
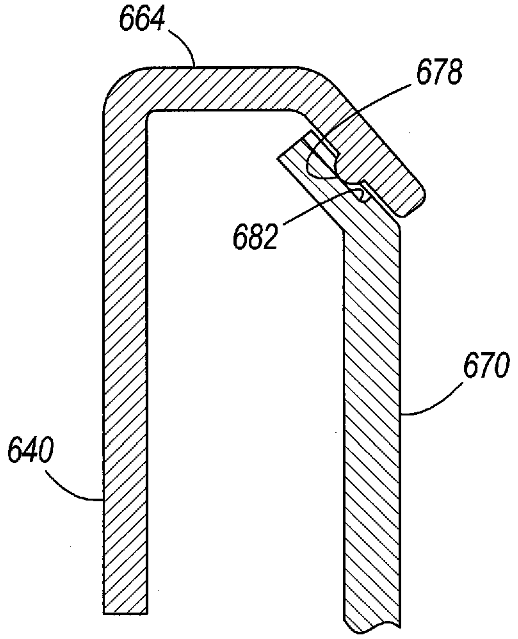
FIG. 17 is an enlarged top cross-sectional view illustrating engagement of the detent in a recess as shown in FIG. 16.

FIG. 16 illustrates another alternative construction of the detent member 678. In the illustrated construction, the detent member 678 is provided on the end of the pointer 664, which is somewhat resilient and which may be at least partially formed of spring steel or other resilient material. The recesses 682 are formed proximate the second indicator members 668 (e.g., on the scale 670). As shown in more detail in FIG. 17, the end (the detent member 678) of the pointer 664 snaps into place at a recess 682 to position the support post 640 and the bevel plate 644 (and the shoe plate 630 and the saw blade 622) in the corresponding predetermined bevel angle position.

Figure 18:
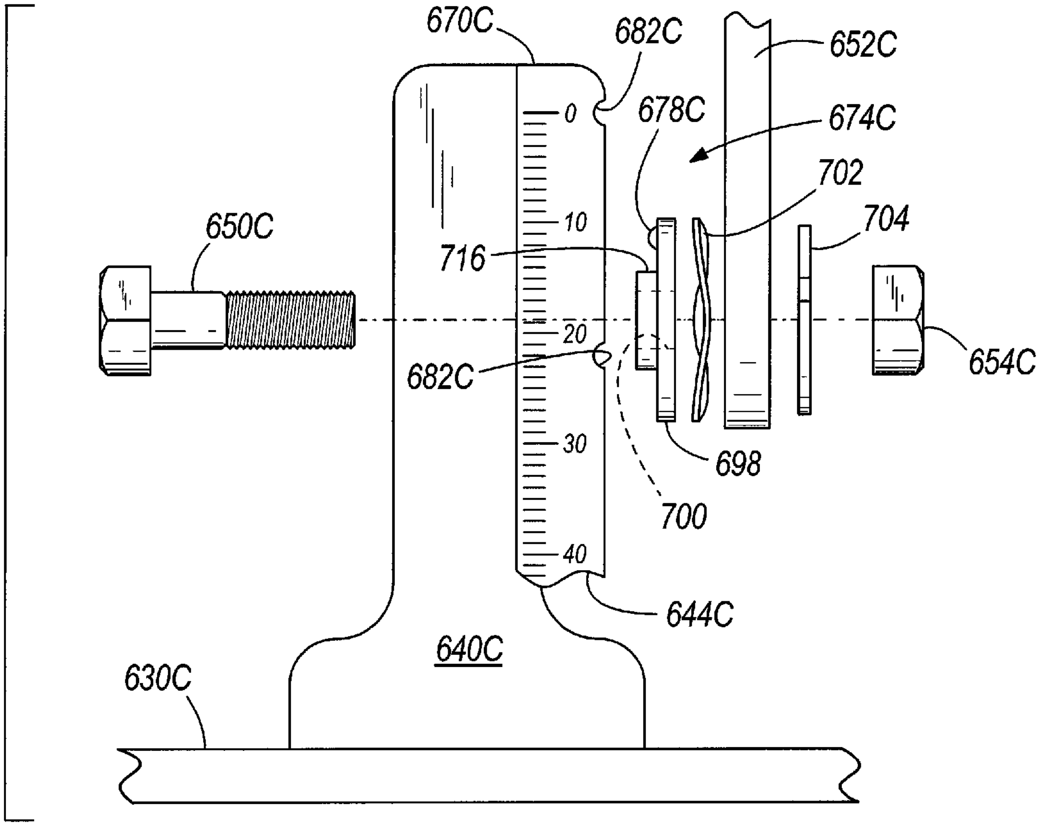
FIG. 18 is a side exploded view of yet another construction of a bevel angle detent mechanism of the bevel angle adjustment mechanism of FIG. 14A.

An alternative construction of a bevel angle detent mechanism 674C for a saw 610C (partially shown) is illustrated in FIG. 18. The bevel angle detent mechanism 674C is similar to the bevel angle detent mechanism 674 illustrated in FIGS. 14B-14C and FIGS. 15-17, and common elements have the same reference number "C".

The bevel angle detent mechanism 674C includes a detent support member 698 supporting the detent member 678C. A central aperture 700 receives the connecting member 650C to connect the detent support member 698 to the structure supporting the detent member 678C (e.g., the support post 640C). A spring member such as a wave spring 702 biases the detent support member 698 and the detent member 678C toward the bevel plate 644C and the recesses 682C. A washer 704 is provided between the locking nut 654C and the locking lever 652C.

In the illustrated construction, the detent member 678C is formed on the detent support member 698. However, in other constructions (not shown), the detent member 678C may be separate from and connectable to the detent support member 698 (e.g., with the threaded housing 690, shown in FIG. 14C).

In operation, to adjust the bevel angle of the saw blade (not shown), the locking lever 658C is moved from the locked position to the unlocked position. The bevel plate 644C (and the housing assembly (not shown)) is moved relative to support post 640C (and the shoe plate 630) until the saw blade is in the desired bevel angle position (as indicated by the alignment of the pointer (not shown) with the selected second indicator member 668C).

If the detent member 678C passes a recess 682C (when the saw blade has been moved to the corresponding predetermined bevel angle), the wave spring 702 will cause the detent member 678C to enter the recess 682C. The operator will feel a resistance to further adjustment of the bevel angle position. However, if the operator wants to move to another bevel angle position, the moving force will overcome the resistance of the detent member 678C in the recess 682C and the biasing force of the wave spring 702. Once the operator has positioned the saw blade in the desired bevel angle position, the locking lever 658C is moved to the locked position so that the nut 654C clamps the bevel plate 644C to the support post 640C.

Figure 19:
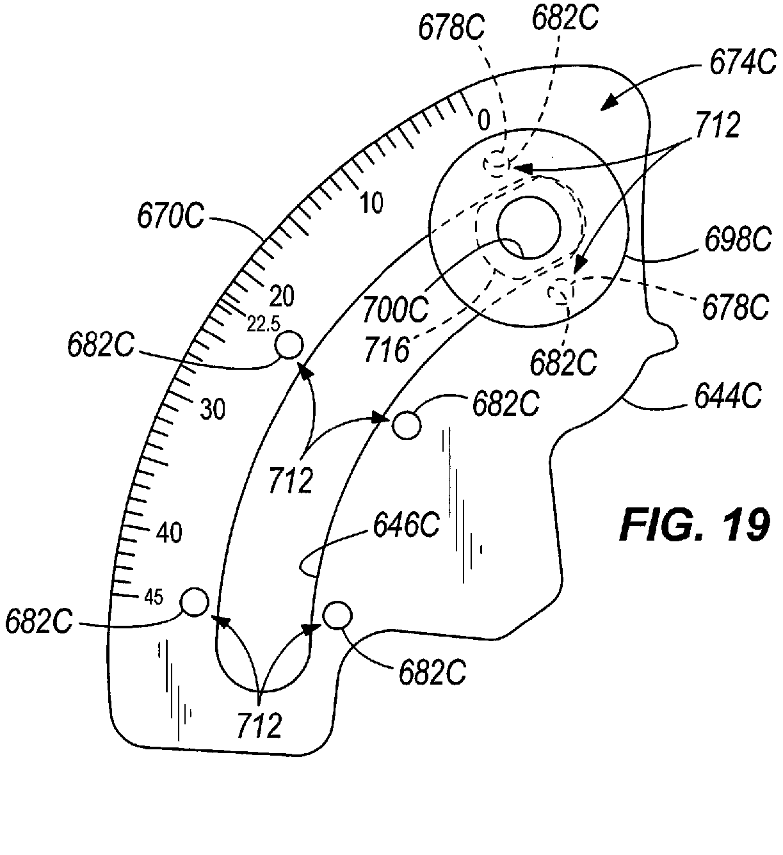
FIG. 19 is a front view of a portion of an alternative construction of the bevel angle detent mechanism shown in FIG. 18.
Figure 20:
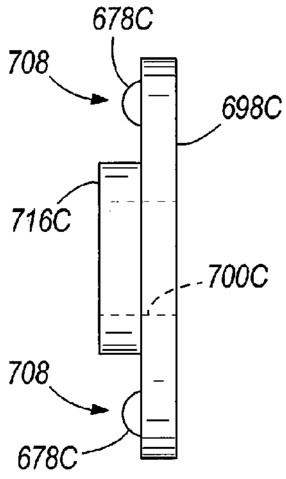
FIG. 20 is an enlarged side view of the detent member shown in FIG. 19.

An alternative construction of the bevel angle detent mechanism 674C is illustrated in FIGS. 19-20. In the illustrated construction, the detent support member 698 supports a number of detent members 678C (e.g., a pair 708 of detent members 678C). A corresponding number of recesses 682C (e.g., a pair 712 of recesses 682C) is formed at each predetermined bevel angle position. During adjustment of the bevel angle of the saw blade (not shown), if the pair 708 of detent members 678C passes a pair 712 of recesses 682C (when the saw blade has been moved to the corresponding predetermined bevel angle), the spring (not shown) will cause the detent members 678C to enter the recesses 682C.

In some situations (e.g., to accommodate angular inaccuracies in construction), an operator may desire to use the saw with the saw blade in a bevel angle position close to but not in a predetermined bevel angle position corresponding to the engagement of the detent member 678C and an associated recess 682C (e.g., a degree or less out of the detent-recess engaged position). However, with some bevel detent mechanisms, the bevel detent mechanism may tend to draw the associated components from the desired bevel angle position (e.g., 44°) to the nearby predetermined bevel angle position (the detent-recess engaged position, e.g., 45°). For example, the ramped surfaces of the detent member (e.g., a detent ball) and/or of the recess and the biasing force of the spring may cooperate to draw the components to the predetermined bevel angle position in which detent member is fully engaged with the recess.

To accommodate the desired minor angular adjustment out of the predetermined bevel angle position, the bevel angle detent mechanism 674C may be deactivated or over-ridden such that, when the saw blade is in a predetermined bevel angle position (in which the detent member 678C would normally engage the recess 682C), the detent member 678C would not engage the recess 682C.

In the construction illustrated in FIG. 19, the detent support member 698C may be movable to a position in which the detent members 678C are not engageable in the recesses 682C, even when the saw blade is in a predetermined bevel angle position. For example, the detent support member 698C can be pivoted to a position in which the detent members 678C are in the arcuate groove 646C. In such a position, the detent members 678C cannot engage the recesses 682C regardless of the bevel angle position. When bevel angle detent action is again desired, the operator can adjust the detent support member 698C to the position shown in FIG. 19.

Also, as shown in FIG. 18, the detent support member 698 has a stepped portion 716. As shown in FIG. 19, the stepped portion 716C has a non-circular cross-section and follows the arcuate groove 646C to prevent undesired rotation of the detent support member 698C and of the detent members 678C. If sufficient distance is provided, the detent support member 698C can be retracted so that the stepped portion 716C moves out of the arcuate groove 646C and pivoted so that the stepped portion 716C cannot re-enter the groove 646C and so that the detent support member 698C is maintained in the retracted position. In this retracted position, the detent members 678C are also retracted and cannot engage in the recesses 682C. When bevel angle detent action is again desired, the operator can adjust the detent support member 698C to the position shown in FIG. 19.

In some instances, the predetermined bevel angle position(s) provided by the bevel angle detent mechanism 674 may not be accurate when compared to the actual bevel angle position of the saw blade 622 (e.g., the predetermined bevel angle position "45°" may actually position the saw blade at a bevel angle of 44 degrees). For example, components of the saw 610 may have been damaged (e.g., the support post 640 or the bevel plate 644 could be bent) or may not have been assembled correctly (e.g., the support post 640 or the bevel plate 644 could be assembled out of alignment) or precisely (e.g., because of manufacturing tolerances).

Figure 21:
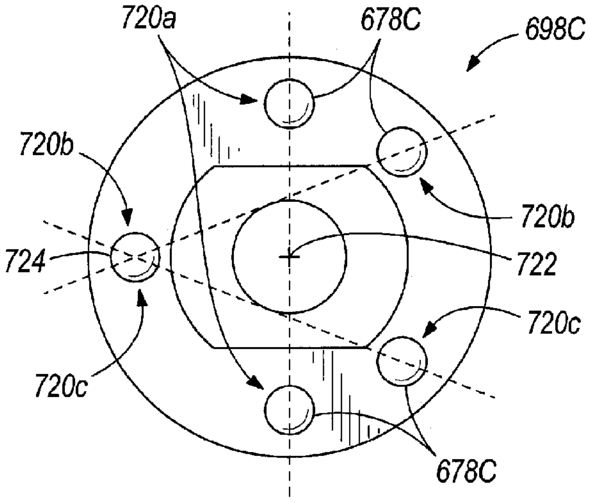
FIG. 21 is an enlarged front view of an alternative construction of the detent member shown in FIG. 19.

The bevel angle detent mechanism 674 may include structure which is adjustable, for example, to correct the position of the predetermined bevel angle position(s) provided by the mechanism 674. FIG. 21 illustrates an alternative construction of the detent support member 698C which is operable to adjust or correct the predetermined bevel angle position(s).

As shown in FIG. 21, the detent support member 698C supports multiple sets 720 of detent members 678C which are located at different positions relative to the central axis 722 of the detent support member 698C (and of the connecting member 650C). The main set 720*a* of detent members 678C is positioned along a line through the central axis 722. One auxiliary set 720*b* of detent members 678C is offset from the central axis 722 in one direction, and the other auxiliary set 720*c* is offset from the central axis 722 in the opposite direction. The detent member 724 serves as a detent member 678C for both auxiliary sets 720*b* and 720*c*.

To adjust the position of the predetermined bevel angle positions, the detent support member 698C is pivoted to a position in which one of the auxiliary sets 720*b* and 720*c* of detent members 678C is positioned to be engageable with the pairs 712 of recesses 682C (the engaging detent members 678C; e.g., in the position of the detent members 678C shown in FIG. 19). This adjustment will position the engaging detent members at a location which is offset from the central axis 722 of the connecting member 650C to adjust the bevel angle positions in which the detent members 678C will engage the recesses 682C.

In another construction (not shown), the detent support member 698C may have an eccentric shape and may support multiple individual detent members 678C (in the construction illustrated in FIG. 18) or multiple auxiliary sets 720 of detent members 678C (in the construction illustrated in FIGS. 19-20 and in FIG. 21) at different locations offset from the central axis 722. Pivoting movement of detent support member 698C will position one of the auxiliary sets 720 of detent members 678C to be engageable with the pairs 712 of recesses 682C (the engaging detent members 678C; e.g., in the position of the detent members 678C shown in FIG. 19).

In such constructions, the detent members 678C which are positioned not to be engageable with the recesses 682C (the non-engaging detent members 678C) are supported on the detent support member 698C such that the non-engaging detent members 678C will not engage or interact with the recesses 682C during adjustment of the bevel angle position. The bevel plate 644 and the detent support member 698C are constructed to reduce any potential interference between the non-engaging detent members 678C and the structure of the bevel plate 644C (e.g., the facing surface, the arcuate groove 646C, the recesses 682C) during adjustment of the bevel angle position.

In other constructions (not shown), the structure supporting the detent member(s) 678 and/or the recesses 682 (e.g., the support post 640 and the bevel plate 644) may be adjustable relative to associated ones of the shoe plate 630 and the housing assembly 614. For example, a threaded engagement may be provided to allow pivoting movement of these components and to retain the components in the adjusted positions.

For such constructions, the scale 670C would be adjustable so that the indicated bevel angle is "zeroed" with the adjusted bevel angle. Slots in the scale 670C may enable the scale 670C to be adjustably connected so that the bevel angle can be "zeroed" to provide an accurate angle relative to components of the saw during or after manufacture.

Figure 22:
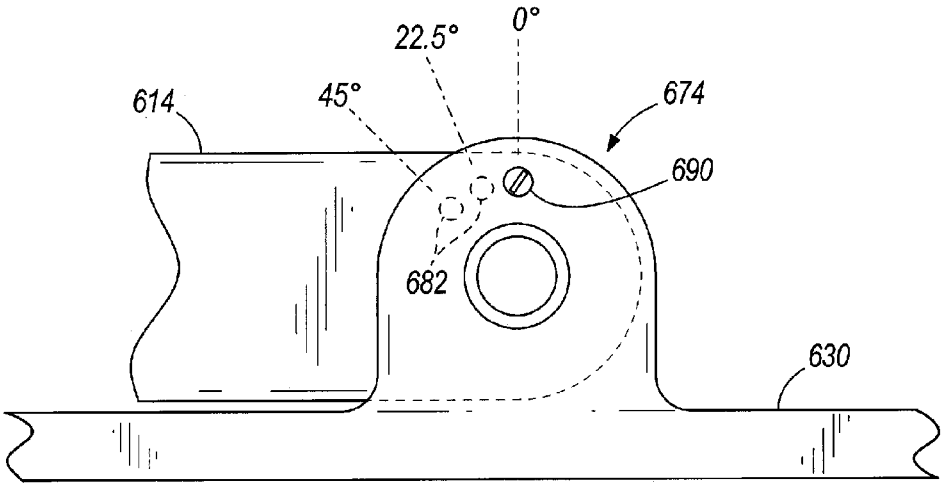
FIG. 22 is a front view of a further construction of a bevel angle detent mechanism of the bevel angle adjustment mechanism of FIG. 14A.

FIG. 22 illustrates another alternative construction of a bevel angle detent mechanism 674 shown in FIGS. 14B-14C and in FIGS. 15-21, with reference to FIG. 14B-14C. In the illustrated construction, the bevel angle detent mechanism 674 is positioned at the location of the pivot connection between the shoe plate 630 and the housing assembly 614. The bevel angle detent mechanism 674 includes the threaded housing 690 supporting the detent member (not shown but similar to the detent member 678 shown in FIGS. 14B-14C).

Figure 23:
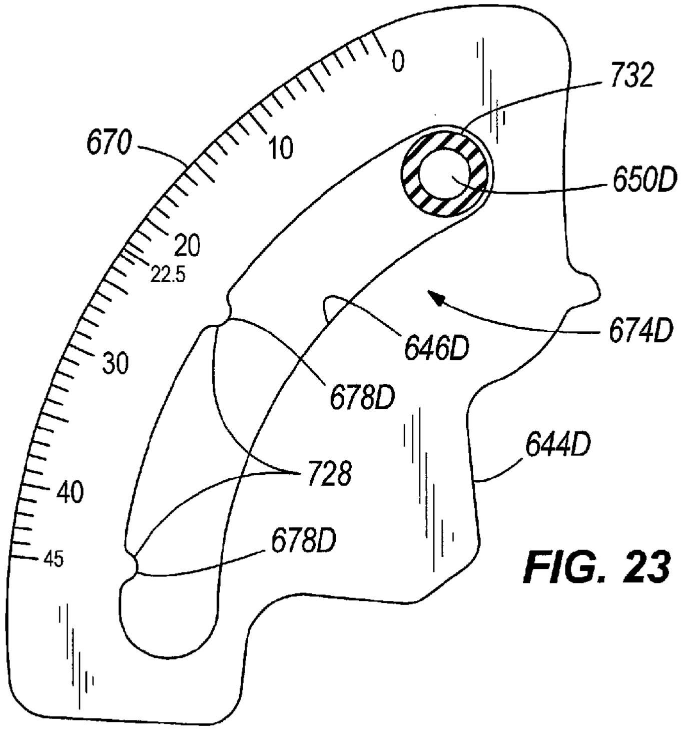
FIG. 23 is a front view of a portion of another construction of a bevel angle detent mechanism of the bevel angle adjustment mechanism of FIG. 14A.

FIG. 23 illustrates another alternative construction of a bevel angle detent mechanism 674D. The bevel angle detent mechanism 674D is similar to that shown in FIGS. 14B-14C and in FIGS. 15-21, with reference to FIG. 19, and common elements have the same reference number "D".

In the illustrated construction, protrusions 728 in the arcuate groove 646D provide detent members 678D. A resilient member 732 surround the connecting member 650D and provides a recess 682D (when flexed). During adjustment of the bevel angle, if the resilient member 732 engages a set of protrusions 728, it will ride up and onto the associated pair of protrusions 728 (when the saw blade has been moved to the corresponding predetermined bevel angle). The operator will feel a resistance to further adjustment of the bevel angle position. However, if the operator wants to move to another bevel angle position, the moving force will overcome the resistance of the resilient member 732 on the protrusions 728. Once the operator has positioned the saw blade in the desired bevel angle position, the locking lever (not shown) is moved to the locked position so that the nut (not shown) clamps the bevel plate 644D to the support post 640D.

Figure 24:
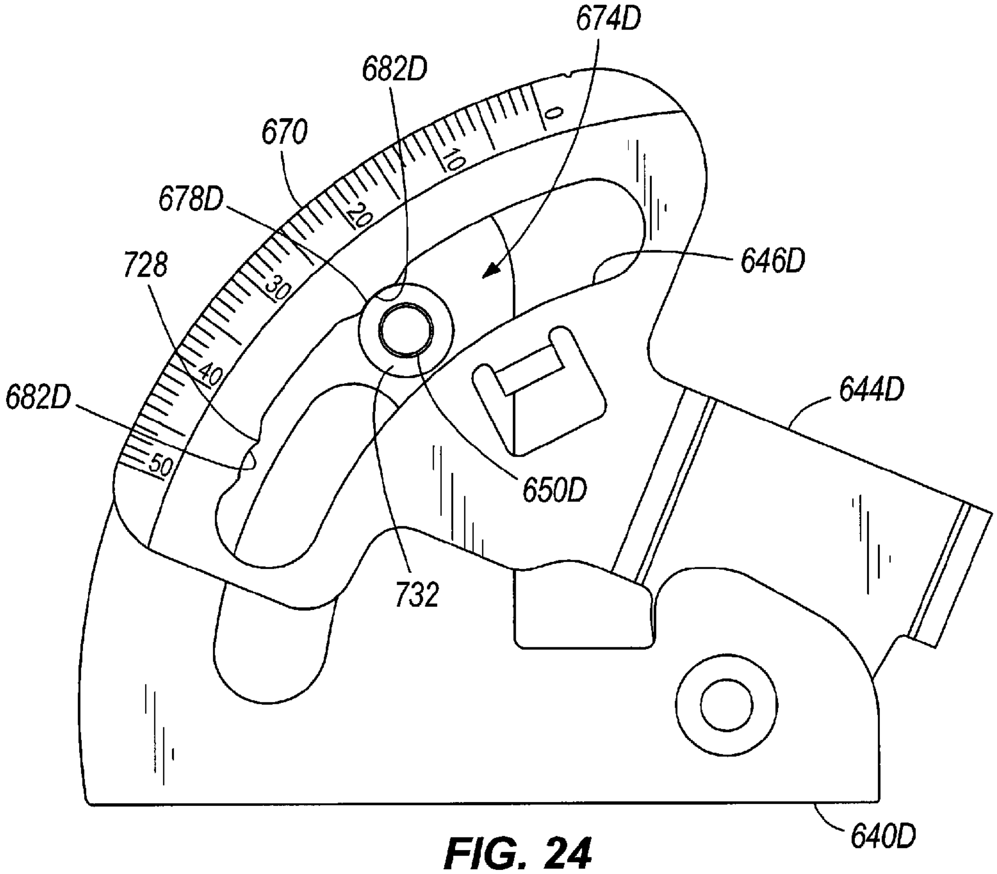
FIG. 24 is a front view of an alternative construction of the bevel angle detent mechanism shown in FIG. 23.

FIG. 24 illustrates an alternative construction of the bevel angle detent mechanism 674D illustrated in FIG. 23. In the illustrated construction, the protrusions 728 provide recesses 682D, and the resilient member 732 provides a detent member 678D. During adjustment of the bevel angle, if the resilient member 732 engages a set of protrusions 728, it will ride up and into the associated pair 712D of recesses 682D (when the saw blade has been moved to the corresponding predetermined bevel angle). The operator will feel a resistance to further adjustment of the bevel angle position. However, if the operator wants to move to another bevel angle position, the moving force will overcome the resistance of the resilient member 732 in the recesses 682D.

Figure 25:
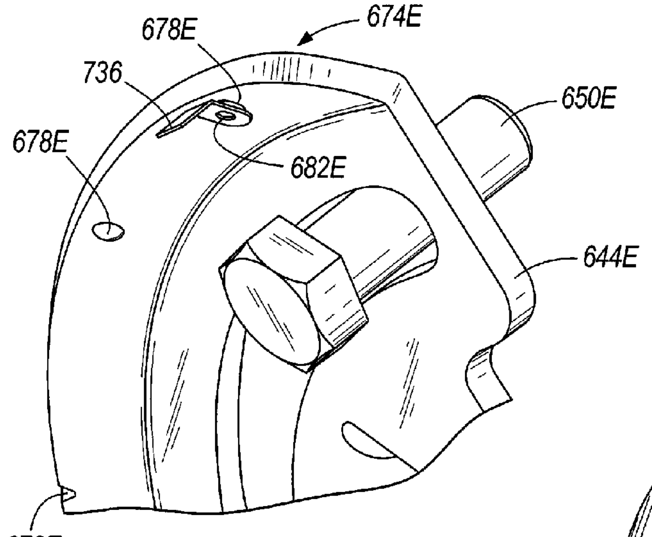
FIG. 25 is a perspective view of a portion of yet another construction of a bevel angle detent mechanism of the bevel angle adjustment mechanism of FIG. 14A.
Figure 26:
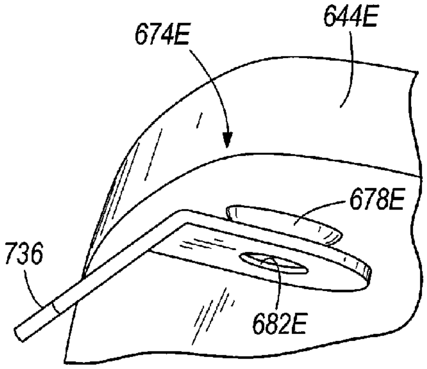
FIG. 26 is an enlarged perspective view illustrating engagement of the detent in the recess as shown in FIG. 25.

FIGS. 25-26 illustrate an alternative construction of a portion of a bevel angle detent mechanism 674E. The bevel angle detent mechanism 674E is similar to the bevel angle detent mechanism 674 illustrated in FIGS. 14B-14C and FIGS. 15-17, and common elements are identified with the same reference number "E". The bevel plate 644E supports a plurality of detent members 678E located in positions corresponding to predetermined bevel angle positions. The support post (not shown) supports a member 736 defining the recess 682E. The member 736 is at least partially formed of a resilient material such as spring steel. The spring portion biases the recess 682E toward the face of the bevel plate 644E so that, when aligned, a detent member 678E will engage the recess 682E to position the support post and the bevel plate 644E (and the shoe plate (not shown) and the saw blade (not shown)) in a predetermined bevel angle position.

Figure 27:
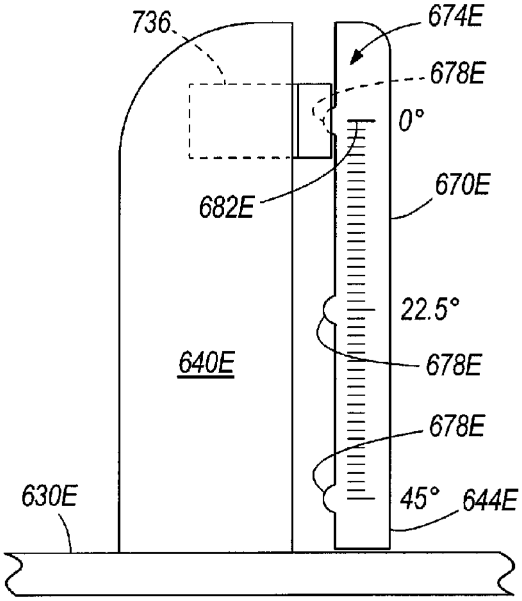
FIG. 27 is a side view of a further construction of a bevel angle detent mechanism of the bevel angle adjustment mechanism of FIG. 14A.
Figure 28:
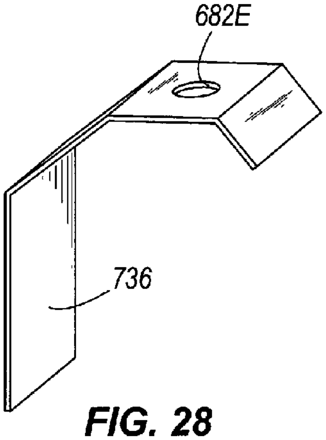
FIG. 28 is an enlarged perspective view of the spring member shown in FIG. 27.
Figure 29:
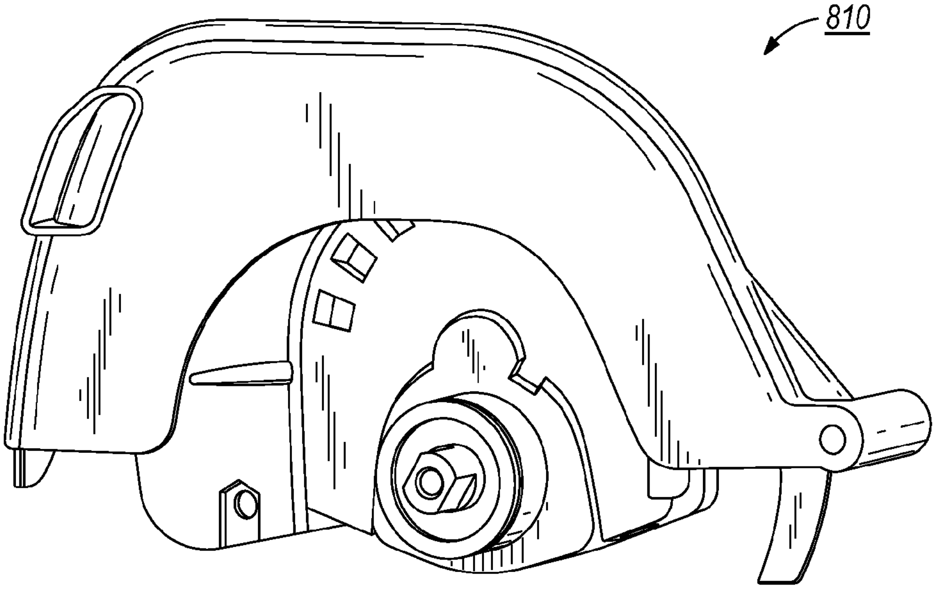
FIG. 29 is a side view of a portion of a power tool having a spindle and gear lock configuration.
Figure 30:
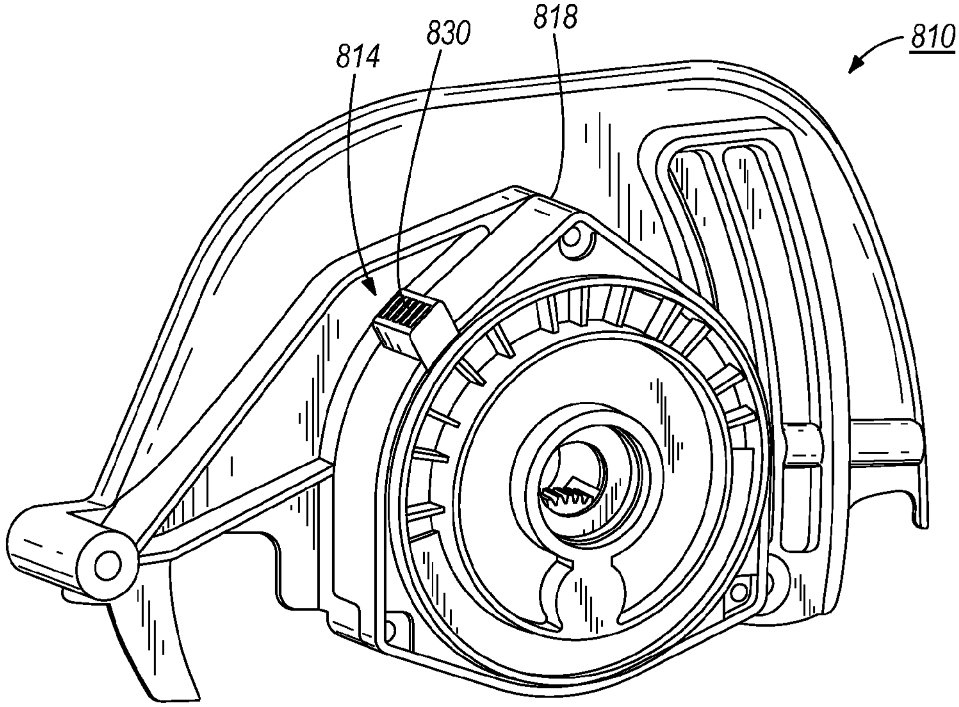
FIG. 30 is an opposite side view of the portion of the power tool shown in FIG. 29.
Figure 31:
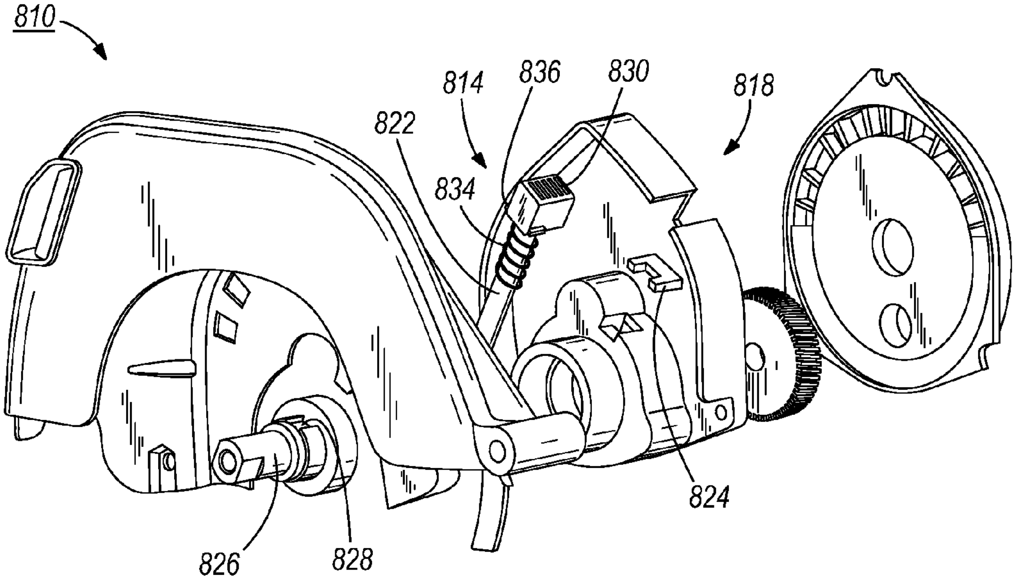
FIG. 31 is an exploded side view of the portion of the power tool shown in FIG. 29.
Figure 32:
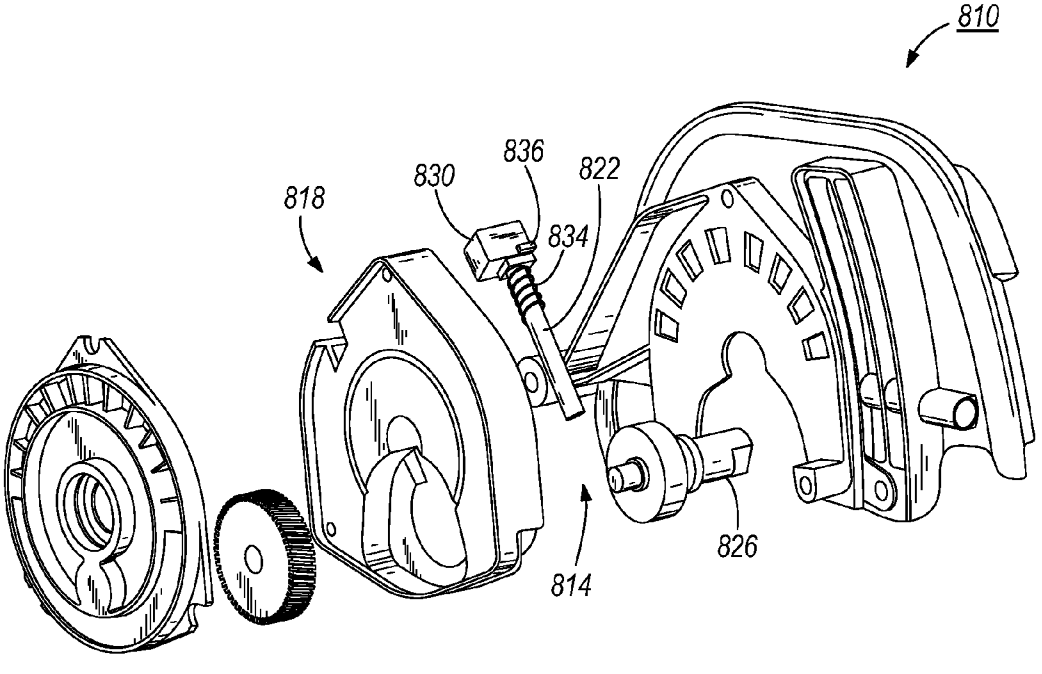
FIG. 32 is an exploded opposite side view of the portion of the power tool shown in FIG. 29.

FIGS. 27-28 illustrate an alternative construction of the bevel angle detent mechanism shown in FIGS. 25-26. In the illustrated construction, the detent members 678E are supported on the scale 670E on the bevel plate 644E. The recess-defining member 736 has a different configuration but generally operates in the same manner as described above.

In other constructions (not shown), the bevel angle detent mechanism 674 may include one or more adjustable detents or recesses which can be positioned (by the operator, manufacturer, service center, etc.) at the desired predetermined bevel angle position(s) (including or in addition to the above-mentioned predetermined bevel angle positions (e.g., 0°, 15°, 22.5°, 30°, 45°, etc.). Such an adjustable arrangement can be provided by a recess-defining member (such as the member 736) which is positionable with the recess 682 at a selected location on the bevel plate 644 or on the scale 670.

In other constructions (not shown), the detent arrangement may be provided by different structure using different forces such as with detent position magnets (not shown) using magnetic force. The detent position magnets can be positioned at predetermined bevel angle positions (e.g., 0°, 22.5°, 45°) during manufacture and/or at other predetermined bevel angle positions (e.g., 15°, 30°, etc.) by the operator.

The bevel angle detent mechanism 674 may also include an infinitely adjustable bevel angle stop assembly (not shown) which is positionable to define a range of bevel angle adjustment less than the full range (e.g., between 0° and 30°, between 15° and 45°, etc.) to provide quick adjustment between two bevel angle positions. A stop member may be mounted along the scale 670 and may be fixed in a position to stop movement of the bevel plate 644 relative to the support post 640 at a selected bevel angle position. The stop member may be positioned anywhere along the scale 670.

It should be understood that, in the above-described constructions, the detent member 678 and the recesses 682 could be reversed (e.g., the detent member 678 could be supported on the support post 640, and the recesses 682 could be defined on the bevel plate 644). The location in which a detent member 678 is shown and described, a recess 682 could be provided, and vice versa.

FIGS. 29-32 illustrate a portion of a power tool, such as a saw or circular saw 810 having a spindle lock 814 in the gear case 818. The spindle lock 814 includes a lock member 822 extending through the gear case 818 and movable in a guide 824. The lock member 822 is engageable with a portion of a spindle 826 to inhibit movement of the spindle 826 on which a saw blade (not shown) is supported so that the saw blade can be more easily changed or adjusted. The spindle 826 includes a stop surface 828 which is engageable by the end of the lock member 822.

A button 830 is depressible by the operator to move the lock member 822 toward the locked position (into engagement with the spindle 826). A spring 834 surrounds the lock member 822. The spring 834 is positioned between the guide 824 and the button 830 and biases the lock member 822 toward the unlocked position (out of engagement with the spindle 826). Laterally-extending surfaces 836 are engageable with the inner surface of the wall of the gear case 818 to limit outward movement of the lock member 822.

The arrangement of the spindle lock 814 and the gear case 818 may provide a cost reduction, simplification of manufacture, increased durability, etc., for example, through a reduction and/or simplification of components.

One or more independent features and/or independent advantages may be set forth in the following claims:

What is claimed is:

1. A power tool comprising:

a motor operable to drive a tool element;

a housing including a housing portion having a circumference;

a handle supported for movement relative to at least a portion of the housing, the handle including a grip portion graspable by an operator to provide for movement of the tool element relative to a work piece, and a support portion in which the housing portion is movably supportable, the support portion being integrally formed as a single piece with the grip portion and extending substantially about the circumference of the housing portion, the support portion including a first end, a second end in facing relationship with the first end, and an intermediate portion between the first end and the second end, wherein the first and second ends define a split in the handle, and wherein the intermediate portion is flexible to allow the split to increase and decrease in size;

an actuating member supported by the handle on the same side as the split as the first end of the support portion; and a connecting member spanning the split in the support portion and interconnecting the second end of the support portion and the actuating member, the actuating member being movable between a locked position, in which the support portion applies a frictional force to the housing portion to hold the handle in a position relative to the housing, and an unlocked position, in which the frictional force applied by the support portion to the housing portion is reduced to allow movement of the handle to another position relative to the housing.

2. The power tool of claim 1, wherein movement of the actuating member towards the locked position causing movement of the second end towards the first end.

3. The power tool of claim 2, wherein movement of the actuating member toward the unlocked position allows movement of the second end away from the first end.

4. The power tool of claim 2, wherein movement of the actuating member toward the unlocked position at least partially causes movement of the second end away from the first end.

5. The power tool of claim 1, wherein the second end defines a recess, and wherein the connecting member includes a connector positionable in the recess to connect the connecting member to the second end.

6. The power tool of claim 5, wherein the second end defines a second recess, wherein the connector is positionable in one of the first-mentioned recess and the second recess, wherein, when the connector is positioned in the first-mentioned recess, in a locked condition, the support portion applies a first force to the housing portion, and wherein, when the connector is positioned in the second recess, in a locked condition, the support portion applies a second force to the housing portion, the second force being different than the first force.

7. The power tool of claim 5, wherein an end of the connector is flared to maintain the connector in the recess.

8. The power tool of claim 5, wherein an end of the connector has a T-shape to maintain the connector in the recess.

9. The power tool of claim 1, wherein at least a portion of the first end circumferentially overlaps the second end.

10. The power tool of claim 1, wherein a plurality of first teeth are provided on the housing portion, and wherein a plurality of second teeth are provided on the support portion, the first teeth and the second teeth being engageable to hold the handle in a position relative to the housing.

11. The power tool of claim 1, wherein the housing portion includes a motor housing supporting the motor, and wherein the support portion is supported on and movable relative to the motor housing.

12. The power tool of claim 1, further comprising:

a switch assembly supported on the handle and operable to connect the motor to a power source, wherein the switch assembly is operable between an un-operated condition, in which the motor is not connectable to the power source, and an operated condition, in which the motor is connectable to the power source; and a locking assembly operable between a locked condition, in which the handle is locked in a position relative to the at least a portion of the housing, and an unlocked condition, in which the handle is movable relative to the at least a portion of the housing;

wherein the locking assembly, in the unlocked condition, prevents the switch assembly from connecting the motor to the power source to thereby prevent the motor from being operated, and wherein the switch assembly, in the operated condition, prevents the locking assembly from being operated from the locked condition to the unlocked condition.

13. The power tool of claim 12, wherein the switch assembly includes a trigger, wherein the locking assembly includes the actuating member, wherein, when the locking assembly is in the unlocked condition, the trigger is engaged to prevent the switch assembly from connecting the motor to the power source, and wherein, when the switch assembly is in the operated condition, a portion of the actuating member is engaged to prevent the locking assembly from being operated from the locked condition to the unlocked condition.

14. The power tool of claim 13, wherein the locking assembly also includes an interlock connecting member connected to the actuating member and including an interlock portion, wherein, when the locking assembly is in the unlocked condition, the interlock portion is engageable with the trigger to prevent the switch assembly from connecting the motor to the power source, and wherein, when the switch assembly is in the operated condition, the interlock portion is engageable with the trigger to prevent the locking assembly from being operated from the locked condition to the unlocked condition.

15. The power tool of claim 14, wherein the connecting member and the interlock connecting member are formed as a single, unitary connecting member.

16. The power tool of claim 14, wherein the interlock connecting member is movable relative to the handle between a first position, in which there is a clearance between the interlock connecting member and the trigger, and a second position, in which the clearance between the interlock connecting member and the trigger is reduced, the second position of the interlock connecting member corresponding to the unlocked condition of the locking assembly, and wherein the handle defines a ramp portion cooperating with the interlock connecting member to position the interlock connecting member in one of the first and second positions.

17. The power tool of claim 1, wherein the power tool includes a circular saw.

18. A power tool comprising:

a motor operable to drive a tool element;

a housing including a housing portion having a circumference;

a handle supported for movement relative to at least a portion of the housing, the handle including a grip portion graspable by an operator to provide for movement of the tool element relative to a work piece, and a support portion movably supportable on the housing portion and extending substantially about the circumference of the housing portion, the support portion including a first end, a second end, and an intermediate portion between the first end and the second end, the second end being movable relative to the first end such that the support portion selectively applies a force to the housing portion;

an actuating assembly operable to selectively cause the support portion to apply force to the housing portion, the actuating assembly including an actuating member supported by the handle, and a connecting member connected between the actuating member and the second end, movement of the actuating member causing movement of the second end relative to the first end;

wherein the second end defines a first recess and a second recess, wherein the connecting member includes a connector positionable in one of the first recess and the second recess to connect the connecting member to the second end, wherein, when the connector is positioned in the first recess, in a locked condition, the support portion applies a first force to the housing portion, and wherein, when the connector is positioned in the second recess, in a locked condition, the support portion applies a second force to the housing portion, the second force being different than the first force.

19. The power tool of claim 18, wherein the intermediate portion is flexible to accommodate movement of the second end relative to the first end.

20. The power tool of claim 18, wherein an end of the connector is flared to maintain the connector in the recess.

21. The power tool of claim 18, wherein an end of the connector has a T-shape to maintain the connector in the recess.

22. The power tool of claim 18, wherein at least a portion of the first end circumferentially overlaps the second end.

23. The power tool of claim 18, wherein a plurality of first teeth are provided on the housing portion, and wherein a plurality of second teeth are provided on the support portion, the first teeth and the second teeth being engageable to hold the handle in a position relative to the at least a portion of the housing.

24. The power tool of claim 18, wherein the housing portion includes a motor housing supporting the motor, and wherein the support portion is supported on and movable relative to the motor housing.

* * * * *